(12) United States Patent
Ouimet et al.

(10) Patent No.: US 11,995,680 B2
(45) Date of Patent: May 28, 2024

(54) METHOD OF CONTROLLING COMMERCE SYSTEM USING SHARE GRABBER TO LEVERAGE SHOPPING LIST

(71) Applicant: Engage3, LLC, Scottsdale, AZ (US)

(72) Inventors: Kenneth J. Ouimet, Davis, CA (US); Timothy L. Ouimet, Scottsdale, AZ (US); Erich B. Wilson, San Jose, CA (US); Anthony Fresina, San Francisco, CA (US); Robert J. Dunst, Jr., Sebastopol, CA (US)

(73) Assignee: Engage3, LLC, Scottsdale, AZ (US)

( * ) Notice: Subject to any disclaimer, the term of this patent is extended or adjusted under 35 U.S.C. 154(b) by 927 days.

(21) Appl. No.: 16/983,556

(22) Filed: Aug. 3, 2020

(65) Prior Publication Data

US 2020/0364740 A1 Nov. 19, 2020

Related U.S. Application Data

(63) Continuation of application No. 13/282,322, filed on Oct. 26, 2011, now abandoned, which is a
(Continued)

(51) Int. Cl.
*G06Q 30/00* (2023.01)
*G06Q 30/0207* (2023.01)
*G06Q 30/0601* (2023.01)

(52) U.S. Cl.
CPC ..... *G06Q 30/0239* (2013.01); *G06Q 30/0222* (2013.01); *G06Q 30/0633* (2013.01)

(58) Field of Classification Search
CPC ........... G06Q 30/0239; G06Q 30/0222; G06Q 30/0633
See application file for complete search history.

(56) References Cited

U.S. PATENT DOCUMENTS 6,185,541 B1   2/2001   Scroggie et al.
6,236,990 B1   5/2001   Geller et al.
(Continued)

FOREIGN PATENT DOCUMENTS

WO   0229508 A2   4/2002

OTHER PUBLICATIONS

Carpenter, Jason M. "Consumer shopping value, satisfaction and loyalty in discount retailing." Journal of retailing and consumer services 15.5 (2008): 358-363. (Year: 2008).*
(Continued)

*Primary Examiner* — Matthew E Zimmerman
(74) *Attorney, Agent, or Firm* — Robert D. Atkins; PATENT LAW GROUP: Atkins and Associates, P.C.

(57) ABSTRACT

A commerce system has a plurality of retailers offering products for sale. Product information associated with the products is collected and stored in a central database. A consumer uses a website to create a shopping list with weighted preferences for product attributes. An individualized discount is generated by a consumer service provider for products on the shopping list directed to the consumer. The shopping list with all products aggregated for one retailer is optimized based on the product information in the database, the weighted preferences for the product attributes, and the individualized discounts. The consumer uses the optimized shopping list to assist with purchasing decisions. An incremental profit can be determined based on an aggregation of the products on the optimized shopping list. Purchasing decisions within the commerce system are controlled by enabling the consumer to select the products for purchase from the retailer.

6 Claims, 11 Drawing Sheets

Related U.S. Application Data continuation-in-part of application No. 13/171,262, filed on Jun. 28, 2011, now abandoned, which is a continuation-in-part of application No. 12/806,951, filed on Aug. 24, 2010, now abandoned, which is a continuation-in-part of application No. 12/804,272, filed on Jul. 15, 2010, now abandoned, said application No. 13/171,262 is a continuation-in-part of application No. 13/079,561, filed on Apr. 4, 2011, now abandoned, said application No. 13/282,322 is a continuation-in-part of application No. 13/272,916, filed on Oct. 13, 2011, now abandoned, which is a continuation-in-part of application No. 13/049,800, filed on Mar. 16, 2011, now abandoned, said application No. 13/282,322 is a continuation-in-part of application No. 13/079,561, filed on Apr. 4, 2011, now abandoned.

(56) References Cited

U.S. PATENT DOCUMENTS

| | | | |
|---|---|---|---|
| 6,847,936 B2* | 1/2005 | Fang | G06Q 30/0601 705/26.1 |
| 6,925,441 B1 | 8/2005 | Jones, III et al. | |
| 7,136,829 B2 | 11/2006 | Hellal et al. | |
| 7,672,876 B2 | 3/2010 | Bonner et al. | |
| 7,734,513 B2 | 6/2010 | Bonner et al. | |
| 7,739,157 B2 | 6/2010 | Bonner et al. | |
| 7,742,952 B2 | 6/2010 | Bonner et al. | |
| 7,756,755 B2 | 7/2010 | Ghosh et al. | |
| 7,783,527 B2 | 8/2010 | Bonner et al. | |
| 7,783,530 B2 | 8/2010 | Slemmer et al. | |
| 7,792,710 B2 | 9/2010 | Bonner et al. | |
| 7,848,964 B2 | 10/2010 | Bonner et al. | |
| 7,917,405 B2 | 3/2011 | Bonner et al. | |
| 8,019,656 B2 | 9/2011 | Baran et al. | |
| 8,095,439 B1 | 1/2012 | Harman et al. | |
| 8,504,440 B1 | 8/2013 | Kolawa et al. | |
| 8,538,824 B1 | 9/2013 | McKay et al. | |
| 8,600,835 B1 | 12/2013 | Lueck | |
| 8,645,223 B2 | 2/2014 | Ouimet | |
| 2002/0004753 A1 | 1/2002 | Perkowski | |
| 2002/0069115 A1 | 6/2002 | Fitzpatrick | |
| 2003/0018613 A1 | 1/2003 | Oytac | |
| 2003/0069780 A1* | 4/2003 | Hailwood | G06Q 30/02 705/7.29 |
| 2003/0105682 A1 | 6/2003 | Dicker et al. | |
| 2003/0110072 A1 | 6/2003 | Delurgio et al. | |
| 2003/0115107 A1* | 6/2003 | Amensen | G06Q 30/06 705/26.8 |
| 2004/0068413 A1 | 4/2004 | Musgrove et al. | |
| 2004/0117290 A1 | 6/2004 | Shacham | |
| 2004/0128210 A1* | 7/2004 | Gabos | G06Q 30/0211 705/26.8 |
| 2005/0010494 A1* | 1/2005 | Mourad | G06Q 30/02 705/26.8 |
| 2005/0080683 A1 | 4/2005 | Jordan | |
| 2005/0159974 A1 | 7/2005 | Moss et al. | |
| 2005/0160014 A1 | 7/2005 | Moss et al. | |
| 2005/0189414 A1 | 9/2005 | Fano et al. | |
| 2006/0080274 A1 | 4/2006 | Mourad | |
| 2006/0095281 A1 | 5/2006 | Chickering et al. | |
| 2006/0157564 A1 | 7/2006 | Schulte | |
| 2006/0248024 A1 | 11/2006 | Funaki et al. | |
| 2006/0259372 A1 | 11/2006 | Perrier et al. | |
| 2007/0192168 A1 | 8/2007 | Van Luchene | |
| 2007/0192183 A1 | 8/2007 | Monaco et al. | |
| 2007/0208630 A1 | 9/2007 | Chatter et al. | |
| 2007/0226054 A1* | 9/2007 | Keil | G06Q 30/0207 705/14.1 |
| 2007/0255696 A1 | 11/2007 | Desbarats | |
| 2008/0004926 A1 | 1/2008 | Horvitz et al. | |
| 2008/0033809 A1 | 2/2008 | Black et al. | |
| 2008/0154720 A1* | 6/2008 | Gounares | G06Q 30/02 701/533 |
| 2008/0167972 A1 | 7/2008 | Rodriguez et al. | |
| 2008/0189169 A1 | 8/2008 | Turpin et al. | |
| 2008/0195472 A1 | 8/2008 | Shandelman et al. | |
| 2009/0006181 A1 | 1/2009 | Ghosh et al. | |
| 2009/0030787 A1 | 1/2009 | Pon et al. | |
| 2009/0083122 A1 | 3/2009 | Angell et al. | |
| 2009/0157476 A1 | 6/2009 | Itani et al. | |
| 2009/0164304 A1 | 6/2009 | Otto et al. | |
| 2009/0240518 A1 | 9/2009 | Borom et al. | |
| 2009/0271293 A1 | 10/2009 | Parkhurst et al. | |
| 2009/0299822 A1* | 12/2009 | Harari | G06Q 30/0269 707/999.005 |
| 2009/0313089 A1 | 12/2009 | Bonner et al. | |
| 2010/0125495 A1 | 5/2010 | Smith et al. | |
| 2010/0217650 A1 | 8/2010 | Hartnell | |
| 2011/0029360 A1 | 2/2011 | Gollapalli | |
| 2011/0029364 A1 | 2/2011 | Roeding et al. | |
| 2011/0035288 A1 | 2/2011 | Clyne | |
| 2011/0251897 A1 | 10/2011 | Litvack et al. | |
| 2012/0101914 A1 | 4/2012 | Kumar et al. | |
| 2012/0303479 A1* | 11/2012 | Derks | G06Q 30/00 705/26.8 |

OTHER PUBLICATIONS

"30 of the Most Useful Google Products You Should Consider Using Daily" Jul. 9, 2011. See 19: Shopper. Retrieved online Nov. 28, 2012.

Wishabi Unveils New e-Commerce Technology; Lets Shoppers Make Smarter Buying Decisions to Get the Best Available Deals; Marketwire. Toronto, Jul. 2009. http://proquest.umi.com/pqdweb?did=1779199571&sid=2&Fmt=2&clientId=19649&RQT=309&VName=PQD.

* cited by examiner

| | | | CONSUMER VALUE | FINAL PRICE | NET VALUE |
|---|---|---|---|---|---|
| BB1 | PRODUCT | (BB1 ATTRIBUTES) | 2.50 | 3.00 | 0.83 |
| BB2 | PRODUCT | (BB2 ATTRIBUTES) | 3.10 | 2.60 | 1.19 |
| BB3 | PRODUCT | (BB2 ATTRIBUTES) | 3.40 | 2.30 | 1.48 |
| MB1 | PRODUCT | (MB1 ATTRIBUTES) | 4.50 | 4.38 | 1.03 |
| MB2 | PRODUCT | (MB2 ATTRIBUTES) | 4.90 | 4.25 | 1.15 |
| MB3 | PRODUCT | (MB3 ATTRIBUTES) | 4.70 | 5.10 | 0.92 |
| SB1 | PRODUCT | (SB1 ATTRIBUTES) | 0.82 | 0.96 | 0.85 |
| SB2 | PRODUCT | (SB2 ATTRIBUTES) | 0.90 | 0.84 | 1.08 |
| SB3 | PRODUCT | (SB3 ATTRIBUTES) | 0.75 | 0.67 | 1.12 |
| DB1 | PRODUCT | (DB1 ATTRIBUTES) | 7.41 | 6.75 | 1.10 |
| DB2 | PRODUCT | (DB2 ATTRIBUTES) | 6.96 | 7.10 | 0.98 |
| DB3 | PRODUCT | (DB3 ATTRIBUTES) | 6.58 | 6.50 | 1.01 |

| PRODUCT | RETAILER | DISCOUNTED PRICE | FINAL PRICE | |
|---|---|---|---|---|
| BB3 | RETAILER 70 | $0.90 | $2.60 | /¯ 144 |
| MB2 | RETAILER 68 | 1.07 | 4.25 | |
| SB3 | RETAILER 70 | 0.20 | 0.67 | |
| DB1 | RETAILER 66 | 1.40 | 6.75 | |
| | | 3.57 | 14.27 | |

*FIG. 14*

| PRODUCT | RETAILER | DISCOUNTED PRICE | FINAL PRICE | |
|---|---|---|---|---|
| BB1 | RETAILER 66 | $1.15 | $2.85 | /¯ 174 |
| MB1 | RETAILER 66 | 0.99 | 4.30 | |
| SB1 | RETAILER 66 | 0.17 | 0.78 | |
| DB1 | RETAILER 66 | 1.20 | 6.62 | |
| | | 3.51 | 14.55 | |

*FIG. 15a*

| PRODUCT | RETAILER | DISCOUNTED PRICE | FINAL PRICE | |
|---|---|---|---|---|
| BB2 | RETAILER 68 | $0.92 | $2.50 | /¯ 176 |
| MB2 | RETAILER 68 | 0.89 | 4.21 | |
| SB2 | RETAILER 68 | 0.24 | 0.75 | |
| DB2 | RETAILER 68 | 0.95 | 6.99 | |
| | | 4.00 | 14.45 | |

*FIG. 15b*

| PRODUCT | RETAILER | DISCOUNTED PRICE | FINAL PRICE | |
|---|---|---|---|---|
| BB3 | RETAILER 70 | $0.90 | $2.30 | /¯ 178 |
| MB3 | RETAILER 70 | 1.17 | 4.87 | |
| SB3 | RETAILER 70 | 0.25 | 0.65 | |
| DB3 | RETAILER 70 | 1.31 | 6.45 | |
| | | 3.63 | 14.27 | |

*FIG. 15c*

| PRODUCT | RETAILER | DISCOUNTED PRICE | FINAL PRICE | |
|---|---|---|---|---|
| BB1 | RETAILER 66 | $1.15 | $2.85 | ⟋180 |
| MB1 | RETAILER 66 | 0.99 | 4.30 | |
| SB1 | RETAILER 66 | 0.17 | 0.78 | |
| DB1 | RETAILER 66 | 1.20 | 6.62 | |
| | | 3.51 | 14.55 | |

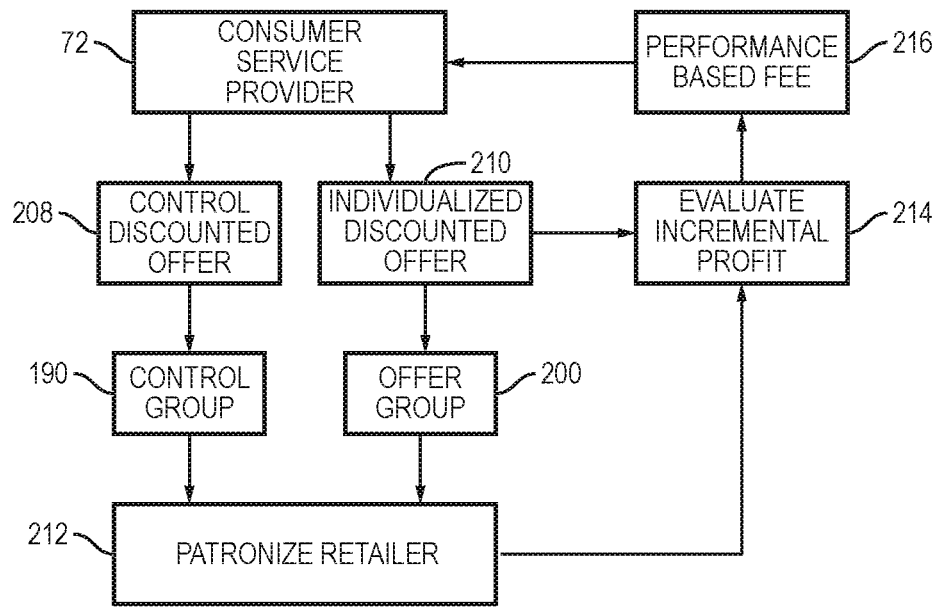

FIG. 18

| PROMOTIONAL PERIOD T1 | PRODUCT P1 | PRODUCT P2 | PRODUCT P3 | PRODUCT P4 |
|---|---|---|---|---|
| CONSUMER 192 | CONTROL | OFFER | CONTROL | OFFER |
| CONSUMER 194 | CONTROL | CONTROL | OFFER | OFFER |
| CONSUMER 196 | CONTROL | CONTROL | CONTROL | CONTROL |
| CONSUMER 202 | OFFER | OFFER | CONTROL | OFFER |
| CONSUMER 204 | OFFER | OFFER | OFFER | CONTROL |
| CONSUMER 206 | OFFER | OFFER | OFFER | OFFER |

FIG. 19

| PRODUCT P1 | PROMOTIONAL PERIOD T1 | PROMOTIONAL PERIOD T2 | PROMOTIONAL PERIOD T3 | PROMOTIONAL PERIOD T4 |
|---|---|---|---|---|
| CONSUMER 192 | CONTROL | OFFER | CONTROL | OFFER |
| CONSUMER 194 | CONTROL | OFFER | OFFER | CONTROL |
| CONSUMER 196 | CONTROL | CONTROL | CONTROL | CONTROL |
| CONSUMER 202 | OFFER | OFFER | CONTROL | OFFER |
| CONSUMER 204 | OFFER | CONTROL | OFFER | OFFER |
| CONSUMER 206 | OFFER | OFFER | OFFER | OFFER |

FIG. 20

| Promotional Period T1 | Group | Store | Regular Price | Discounted Offer | Quantity Purchased | Incremental Profit |
|---|---|---|---|---|---|---|
| CONSUMER 192 | CONTROL | S1 | $4.50 | 0 | 0 | 0 |
| CONSUMER 194 | CONTROL | S2 | $4.75 | 0 | 1 | 0 |
| CONSUMER 196 | CONTROL | S1 | $4.50 | 0 | 0 | 0 |
| CONSUMER 202 | OFFER | S1 | $4.50 | $0.90 | 1 | $0.10 |
| CONSUMER 204 | OFFER | S1 | $4.50 | $0.50 | 2 | $1.00 |
| CONSUMER 206 | OFFER | S2 | $4.75 | $0.25 | 0 | 0 |

METHOD OF CONTROLLING COMMERCE SYSTEM USING SHARE GRABBER TO LEVERAGE SHOPPING LIST

CLAIM TO DOMESTIC PRIORITY

The present application is a continuation of U.S. patent application Ser. No. 13/282,322, filed Oct. 26, 2011, which is a continuation-in-part of U.S. patent application Ser. No. 13/171,262, filed Jun. 28, 2011, which is a continuation-in-part of U.S. patent application Ser. No. 12/806,951, filed Aug. 24, 2010, which is a continuation-in-part of U.S. patent application Ser. No. 12/804,272, filed on Jul. 15, 2010. Additionally, U.S. patent application Ser. No. 13/171,262 is also a continuation-in-part of U.S. patent application Ser. No. 13/079,561, filed Apr. 4, 2011. U.S. patent application Ser. No. 13/282,322 is further a continuation-in-part of U.S. patent application Ser. No. 13/272,916, filed Oct. 13, 2011, which is a continuation-in-part of U.S. patent application Ser. No. 13/049,800, filed Mar. 16, 2011. U.S. patent application Ser. No. 13/282,322 is further a continuation-in-part of U.S. patent application Ser. No. 13/079,561, filed Apr. 4, 2011. All of the above-cited applications are incorporated herein by reference.

FIELD OF THE INVENTION

The present invention relates in general to consumer purchasing and, more particularly, to a commerce system and method of controlling the commerce system using a share grabber to leverage a shopping list.

BACKGROUND OF THE INVENTION

Economic and financial modeling and planning are commonly used to estimate or predict the performance and outcome of real systems, given specific sets of input data of interest. An economic-based system will have many variables and influences which determine its behavior. A model is a mathematical expression or representation, which predicts the outcome or behavior of the system under a variety of conditions. In one sense, it is relatively easy to review historical data, understand its past performance, and state with relative certainty that past behavior of the system was indeed driven by the historical data. A more difficult task is to generate a mathematical model of the system, which predicts how the system will behave with different sets of data and assumptions.

In its basic form, the economic model can be viewed as a predicted or anticipated outcome of a system defined by a mathematical expression and driven by a given set of input data and assumptions. The mathematical expression is formulated or derived from principles of probability and statistics, often by analyzing historical data and corresponding known outcomes, to achieve a best fit of the expected behavior of the system to other sets of data. In other words, the model should be able to predict the outcome or response of the system to a specific set of data being considered or proposed, within a level of confidence, or an acceptable level of uncertainty.

Economic modeling has many uses and applications. One area in which modeling has been applied is in the retail environment. Grocery stores, general merchandise stores, specialty shops, and other retail outlets face stiff competition for limited consumers and business. Most, if not all, retail stores expend great effort to maximize sales, revenue, and profit. Economic modeling can be an effective tool in helping store owners and managers forecast and optimize business decisions. Yet, as an inherent reality of commercial transactions, the benefits bestowed on the retailer often come at a cost or disadvantage to the consumer. Maximizing sales and profits for a retailer does not necessarily expand competition and achieve the lowest price for the consumer.

On the other side of the transaction, the consumers are interested in quality, low prices, comparative product features, convenience, and receiving the most value for the money. Economic modeling can also be an effective tool in helping consumers achieve these goals. However, consumers have a distinct disadvantage in attempting to compile models for their benefit. Retailers have ready access to the historical transaction log (T-LOG) sales data, consumers do not. The advantage goes to the retailer. The lack of access to comprehensive, reliable, and objective product information essential to providing effective comparative shopping services restricts the consumer's ability to find the lowest prices, compare product features, and make the best purchasing decisions.

For the consumer, some comparative product information can be gathered from various electronic and paper sources, such as online websites, paper catalogs, and media advertisements. However, such product information is sponsored by the retailer and slanted at best, typically limited to the specific retailer offering the product and presented in a manner favorable to the retailer. That is, the product information released by the retailer is subjective and incomplete, i.e., the consumer only sees what the retailer wants the consumer to see. For example, the pricing information may not provide a comparison with competitors for similar products. The product descriptions may not include all product features or attributes of interest to the consumer.

Alternatively, the consumer can visit all retailers offering a particular type of product and record the various prices, product descriptions, and retailer amenities to make a purchase decision. The brute force approach of one person physically traveling to or otherwise researching each retailer for all product information is impractical for most people. Many people do compare multiple retailers, e.g., when shopping online, particularly for high ticket items. Yet, the time people are willing to spend reviewing product information decreases rapidly with price. Little time is spent reviewing commodity items. In any case, the consumer has limited time to do comparative shopping and mere searching does not constitute an optimization of the purchasing decision. Optimization requires access to data, i.e., comprehensive, reliable, efficient, and objective product information, so the consumer remains hampered in achieving a level playing field with the retailer.

Another purpose of economic modeling is to develop a marketing plan for the retailer. The retailer may use a mass marketing campaign through a media outlet, such as a newspaper, television, and radio to promote products. A traditional mass marketing approach commonly employs a one-price-fits-all marketing strategy. The retailer puts out an advertisement to the general public, e.g., newspaper ad for a sale or discounted price on a product. Anyone and everyone that responds to the advertisement can purchase the product at the stated advertised sale price.

Even though the retailer expends large amounts of time and money into marketing campaigns, there is little or no feedback as to the success or performance of the particular marketing strategy. The retailer often cannot determine how many consumers actually made a purchase decision as a direct result of responding to the advertisement. The consumer may have selected the item for purchase with no prior knowledge of the advertisement, i.e., the published advertisement is not the catalyst for bringing the consumer into the retailer. Alternatively, the consumer might have purchased the item without a discount. The consumer will of course accept the discounted price, but would have paid regular price. In some cases, the retailer is unnecessarily foregoing profit by mass market discounting the product to the general public.

Retailers have used a variety of techniques to understand the success or performance of a particular marketing strategy. For example, a marketing agency may charge the retailer based on how many people viewed the advertisement, e.g., clicked on the advertisement or promotion on a website. If a consumer views or clicks on the advertisement or promotion, the retailer is charged for that event. However, there is no correlation to an actual consumer purchase. The retailer is charged for the consumer merely coming into contact with the advertisement, even if the consumer does not purchase the product. Moreover, even if the consumer does purchase the product, the marketing evaluation does not take into account whether the consumer would have purchased the product without a promotion. The promotion is accepted by the consumer, but marketing dollars are wasted and potential profit is lost because the promotion is not the controlling factor in making the purchasing decision. Alternatively, the promotion could have caused the consumer to purchase the advertised product at a lower profit margin at the expense of cannibalizing sales of another product having a higher profit margin sold by the same retailer.

Marketing segmentation involves identifying and targeting specific market segments that are more likely to be interested in purchasing the retailer's products. Mass marketing generally does not lend itself to focused market segmentation, other than possibly the type of publication and geographic area where the advertisement is published. If the newspaper is a local fitness publication made available outside health oriented stores, then primarily only the consumers with an interest in fitness who might pick up the fitness publication will see the advertisement. Nonetheless, every fitness oriented consumer who acts on the advertisement receives the same sale or discounted price on the product.

In a highly competitive market, the profit margin is paper thin and consumers and products are becoming more differentiated. Consumers are often well informed through electronic media and will have appetites only for specific products. Retailers must understand and act upon the market segment which is tuned into their niche product area to make effective use of marketing dollars. The traditional mass marketing approach using gross market segmentation is insufficient to accurately predict consumer behavior across the various market segments. A more refined market strategy is needed to help focus resources on specific market segments that have the greatest potential of achieving a positive purchasing decision by the consumer for a product directed to that particular market segment. The retailers remain motivated to optimize marketing strategy, particularly pricing strategy, to maximize profit and revenue.

SUMMARY OF THE INVENTION

A need exists to evaluate the effectiveness and performance of a marketing promotion. Accordingly, in one embodiment, the present invention is a method of controlling a commerce system including a plurality of retailers offering products for sale comprising the steps of collecting product information associated with the products, storing the product information in a database, providing a website for a consumer to create a shopping list with weighted preferences for product attributes, generating an individualized discount for products on the shopping list directed to the consumer, optimizing the shopping list with all products aggregated for one retailer based on the product information in the database, the weighted preferences for the product attributes, and the individualized discounts, providing the optimized shopping list to the consumer to assist with purchasing decisions, and controlling the purchasing decisions within the commerce system by enabling the consumer to select the products for purchase from the one retailer.

In another embodiment, the present invention is a method of controlling a commerce system including a plurality of retailers offering products for sale comprising the steps of collecting product information, storing the product information in a database, generating a shopping list with weighted preferences for product attributes, generating a discount for products on the shopping list, optimizing the shopping list with all products aggregated for a predetermined number of retailers based on the product information in the database, the weighted preferences for the product attributes, and the discount, and utilizing the optimized shopping list to control purchasing decisions within the commerce system by enabling a consumer to select the products for purchase from the retailers.

In another embodiment, the present invention is a method of controlling a commerce system comprising the steps of generating a shopping list from product information with weighted preferences for product attributes, generating a discount for products on the shopping list, optimizing the shopping list with all products aggregated for a retailer based on the product information, the weighted preferences for the product attributes, and the discount, and controlling purchasing decisions within the commerce system by enabling a consumer to select the products for purchase based from the retailer on the optimized shopping list.

In another embodiment, the present invention is a computer program product usable with a programmable computer processor having a computer readable program code embodied in a computer usable medium for controlling a commerce system including a plurality of retailers offering products for sale comprising the steps of generating a shopping list from product information with weighted preferences for product attributes, generating a discount for products on the shopping list, optimizing the shopping list with all products aggregated for a retailer based on the product information in the database, the weighted preferences for the product attributes, and the discount, and controlling purchasing decisions within the commerce system by enabling a consumer to select the products for purchase based from the retailer on the optimized shopping list.

In another embodiment, the present invention is a method of controlling a commerce system comprising the steps of providing a database containing product information, generating a shopping list for a consumer based on the product information, aggregating products on the shopping list to a retailer with a discount for a portion of the products on the shopping list, and controlling purchasing decisions within the commerce system by enabling the consumer to select the products for purchase based from the retailer on the shopping list.

BRIEF DESCRIPTION OF THE DRAWINGS

FIG. 14 illustrates the optimized shopping list with the individualized discount for download onto the consumer cell phone;

FIGS. 15a-15c illustrate the optimized shopping list with products aggregated for competing retailers;

FIG. 18 illustrates an evaluation of the effectiveness of discounted offers toward incremental profits using a control group and offer group;

FIG. 19 illustrates consumers assigned to the control group and offer group for a promotional product;

FIG. 20 illustrates consumers assigned to the control group and offer group for a promotional time period;

DETAILED DESCRIPTION OF THE DRAWINGS

Figure 1:
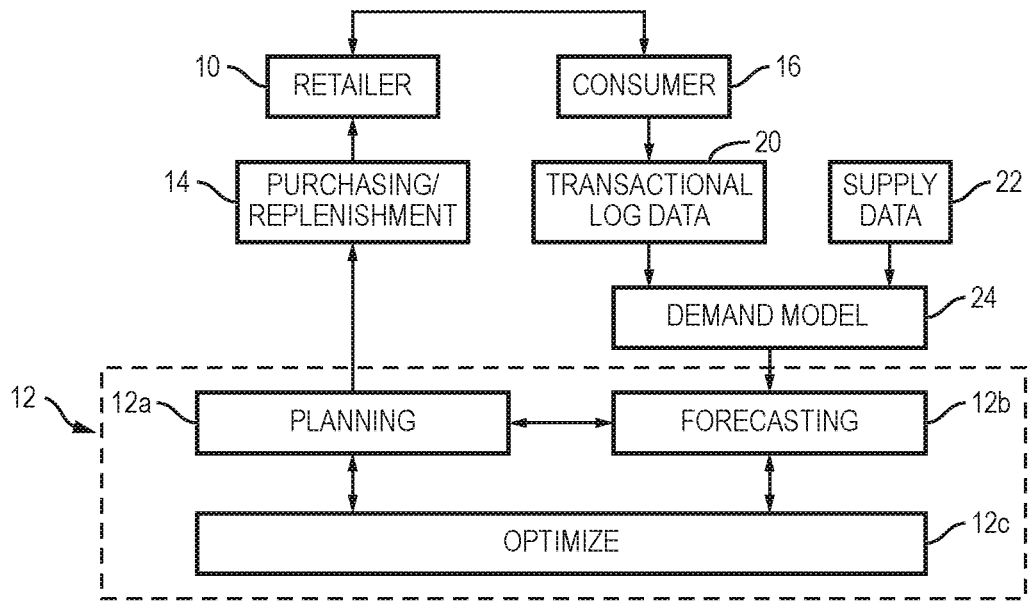
FIG. 1 illustrates a commerce system which analyzes T-LOG data to generate demand models and executes a business plan in accordance with those demand models.

The present invention is described in one or more embodiments in the following description with reference to the figures, in which like numerals represent the same or similar elements. While the invention is described in terms of the best mode for achieving the invention's objectives, it will be appreciated by those skilled in the art that it is intended to cover alternatives, modifications, and equivalents as may be included within the spirit and scope of the invention as defined by the appended claims and their equivalents as supported by the following disclosure and drawings.

Economic and financial modeling and planning is an important business tool that allows companies to conduct business planning, forecast demand, and optimize prices and promotions to meet profit and/or revenue goals. Economic modeling is applicable to many businesses, such as manufacturing, distribution, wholesale, retail, medicine, chemicals, financial markets, investing, exchange rates, inflation rates, pricing of options, value of risk, research and development, and the like.

In the face of mounting competition and high expectations from investors, most, if not all, businesses must look for every advantage they can muster in maximizing market share and profits. The ability to forecast demand, in view of pricing and promotional alternatives, and to consider other factors which materially affect overall revenue and profitability is vital to the success of the bottom line, and the fundamental need to not only survive but to prosper and grow.

In particular, economic modeling is essential to businesses that face thin profit margins, such as general consumer merchandise and other retail outlets. Many businesses are interested in economic modeling and forecasting, particularly when the model provides a high degree of accuracy or confidence. Such information is a powerful tool and highly valuable to the business. While the present discussion will involve a retailer, it is understood that the system described herein is applicable to data analysis for other members in the chain of commerce, or other industries and businesses having similar goals, constraints, and needs.

A retailer routinely collects T-LOG sales data for most if not all products in the normal course of business. Using the T-LOG data, the system generates a demand model for one or more products at one or more stores. The model is based upon the T-LOG data for that product and includes a plurality of parameters. The values of the parameters define the demand model and can be used for making predictions about the future sales activity for the product. For example, the model for each product can be used to predict future demand or sales of the product at that store in response to a proposed price, associated promotions or advertising, as well as impact from holidays and local seasonal variations. Promotion and advertising increase consumer awareness of the product.

An economic demand model analyzes historical retail T-LOG sales data to gain an understanding of retail demand as a function of factors such as price, promotion, time, consumer, seasonal trends, holidays, and other attributes of the product and transaction. The demand model can be used to forecast future demand by consumers as measured by unit sales. Unit sales are typically inversely related to price, i.e., the lower the price, the higher the sales. The quality of the demand model—and therefore the forecast quality—is directly affected by the quantity, composition, and accuracy of historical T-LOG sales data provided to the model.

The retailer makes business decisions based on forecasts. The retailer orders stock for replenishment purposes and selects items for promotion or price discount. To support good decisions, it is important to quantify the quality of each forecast. The retailer can then review any actions to be taken based on the accuracy of the forecasts on a case-by-case basis.

Referring to FIG. 1, retailer 10 has certain product lines or services available to consumers as part of its business plan 12. The terms products and services are interchangeable in the commercial system. Retailer 10 can be a food store chain, general consumer product retailer, drug store, discount warehouse, department store, apparel store, specialty store, or service provider. Retailer 10 has the ability to set pricing, order inventory, run promotions, arrange its product displays, collect and maintain historical sales data, and adjust its strategic business plan.

Business plan 12 includes planning 12*a*, forecasting 12*b*, and optimization 12*c* steps and operations. Business plan 12 gives retailer 10 the ability to evaluate performance and trends, make strategic decisions, set pricing, order inventory, formulate and run promotions, hire employees, expand stores, add and remove product lines, organize product shelving and displays, select signage, and the like. Business plan 12 allows retailer 10 to analyze data, evaluate alternatives, run forecasts, and make decisions to control its operations. With input from the planning 12*a*, forecasting 12*b*, and optimization 12*c* steps and operations of business plan 12, retailer 10 undertakes various purchasing or replenishment operations 14. Retailer 10 can change business plan 12 as needed.

Retailer 10 routinely enters into sales transactions with customer or consumer 16. In fact, retailer 10 maintains and updates its business plan 12 to increase the number of transactions (and thus revenue and/or profit) between retailer 10 and consumer 16. Consumer 16 can be a specific individual, account, or business entity.

For each sale transaction entered into between retailer 10 and consumer 16, information describing the transaction is stored in T-LOG data 20. When a consumer goes through the check-out at a grocery or any other retail store, each of the items to be purchased is scanned and data is collected and stored by a point-of-sale (POS) system, or other suitable data storage system, in T-LOG data 20. The data includes the then current price, promotion, and merchandizing information associated with the product along with the units purchased, and the dollar sales. The date and time, and store and consumer information corresponding to that purchase are also recorded.

T-LOG data 20 contains one or more line items for each retail transaction, such as those shown in Table 1. Each line item includes information or attributes relating to the transaction, such as store number, product number, time of transaction, transaction number, quantity, current price, profit, promotion number, and consumer category or type number. The store number identifies a specific store; product number identifies a product; time of transaction includes date and time of day; quantity is the number of units of the product; current price (in US dollars) can be the regular price, reduced price, or higher price in some circumstances; profit is the difference between current price and cost of selling the item; promotion number identifies any promotion associated with the product, e.g., flyer, ad, discounted offer, sale price, coupon, rebate, end-cap, etc.; consumer identifies the consumer by type, class, region, demographics, or individual, e.g., discount card holder, government sponsored or under-privileged, volume purchaser, corporate entity, preferred consumer, or special member. T-LOG data 20 is accurate, observable, and granular product information based on actual retail transactions within the store. T-LOG data 20 represents the known and observable results from the consumer buying decision or process. T-LOG data 20 may contain thousands of transactions for retailer 10 per store per day, or millions of transactions per chain of stores per day.

TABLE 1

T-LOG Data

| STORE | PRODUCT | TIME | TRANS | QTY | PRICE | PROFIT | PROMOTION | CONSUMER |
|---|---|---|---|---|---|---|---|---|
| S1 | P1 | D1 | T1 | 1 | 1.50 | 0.20 | PROMO1 | C1 |
| S1 | P2 | D1 | T1 | 2 | 0.80 | 0.05 | PROMO2 | C1 |
| S1 | P3 | D1 | T1 | 3 | 3.00 | 0.40 | PROMO3 | C1 |
| S1 | P4 | D1 | T2 | 4 | 1.80 | 0.50 | 0 | C2 |
| S1 | P5 | D1 | T2 | 1 | 2.25 | 0.60 | 0 | C2 |
| S1 | P6 | D1 | T3 | 10 | 2.65 | 0.55 | PROMO4 | C3 |
| S1 | P1 | D2 | T1 | 5 | 1.50 | 0.20 | PROMO1 | C4 |
| S2 | P7 | D3 | T1 | 1 | 5.00 | 1.10 | PROMO5 | C5 |
| S2 | P1 | D3 | T2 | 2 | 1.50 | 0.20 | PROMO1 | C6 |
| S2 | P8 | D3 | T2 | 1 | 3.30 | 0.65 | 0 | C6 |

The first line item shows that on day/time D1, store S1 has transaction T1 in which consumer C1 purchases one product P1 at $1.50. The next two line items also refer to transaction T1 and day/time D1, in which consumer C1 also purchases two products P2 at $0.80 each and three products P3 at price $3.00 each. In transaction T2 on day/time D1, consumer C2 has four products P4 at price $1.80 each and one product P5 at price $2.25. In transaction T3 on day/time D1, consumer C3 has ten products P6 at $2.65 each, in his or her basket. In transaction T1 on day/time D2 (different day and time) in store S1, consumer C4 purchases five products P1 at price $1.50 each. In store S2, transaction T1 with consumer C5 on day/time D3 (different day and time) involves one product P7 at price $5.00. In store S2, transaction T2 with consumer C6 on day/time D3 involves two products P1 at price $1.50 each and one product P8 at price $3.30.

Table 1 further shows that product P1 in transaction T1 has promotion PROM01. PROM01 can be any suitable product promotion such as a front-page featured item in a local advertising flyer. Product P2 in transaction T1 has promotion PROM02 as an end-cap display in store S1. Product P3 in transaction T1 has promotion PROM03 as a reduced sale price with a discounted offer. Product P4 in transaction T2 on day/time D1 has no promotional offering. Likewise, product P5 in transaction T2 has no promotional offering. Product P6 in transaction T3 on day/time D1 has promotion PROM04 as a volume discount for 10 or more items. Product P7 in transaction T1 on day/time D3 has promotion PROMO5 as a $0.50 rebate. Product P8 in transaction T2 has no promotional offering. A promotion may also be classified as a combination of promotions, e.g., flyer with sale price, end-cap with rebate, or individualized discounted offer as described below.

Retailer 10 may also provide additional information to T-LOG data 20 such as promotional calendar and events, holidays, seasonality, store set-up, shelf location, end-cap displays, flyers, and advertisements. The information associated with a flyer distribution, e.g., publication medium, run dates, distribution, product location within flyer, and advertised prices, is stored within T-LOG data 20.

Supply data 22 is also collected and recorded from manufacturers and distributors. Supply data 22 includes inventory or quantity of products available at each location in the chain of commerce, i.e., manufacturer, distributor, and retailer. Supply data 22 includes product on the store shelf and replenishment product in the retailer's storage area.

With T-LOG data 20 and supply data 22 collected, various suitable methods or algorithms can be used to analyze the data and generate demand model 24. Model 24 may use a combination of linear, nonlinear, deterministic, stochastic, static, or dynamic equations or models for analyzing T-LOG data 20 or aggregated T-LOG data and supply data 22 and making predictions about consumer behavior to future transactions for a particular product at a particular store, or across entire product lines for all stores. Model 24 is defined by a plurality of parameters and can be used to generate unit sales forecasting, price optimization, promotion optimization, markdown/clearance optimization, assortment optimization, merchandise and assortment planning, seasonal and holiday variance, and replenishment optimization. Model 24 has a suitable output and reporting system that enables the output from model 24 to be retrieved and analyzed for updating business plan 12.

Figure 2:
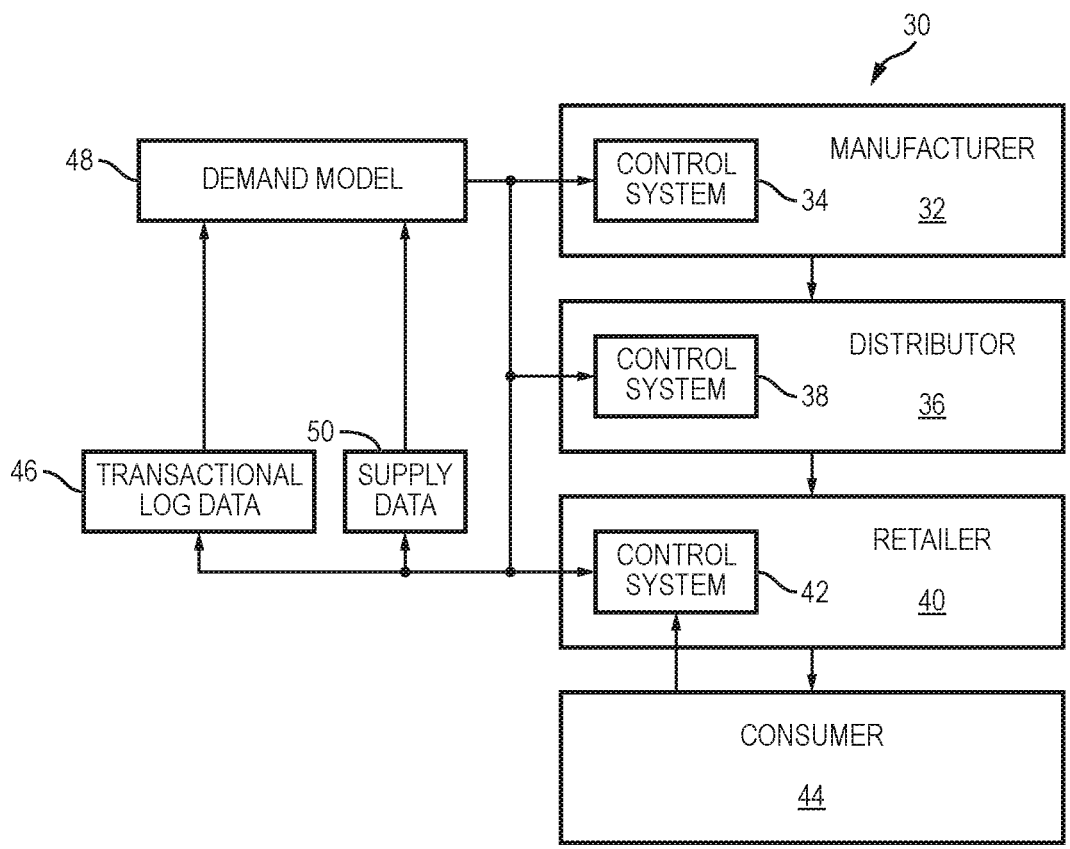
FIG. 2 illustrates a commercial supply, distribution, and consumption chain controlled by a demand model.

In FIG. 2, a commerce system 30 is shown involving the movement of goods between members of the system. Manufacturer 32 produces goods in commerce system 30. Manufacturer 32 uses control system 34 to receive orders, control manufacturing and inventory, and schedule deliveries. Distributor 36 receives goods from manufacturer 32 for distribution within commerce system 30. Distributor 36 uses control system 38 to receive orders, control inventory, and schedule deliveries. Retailer 40 receives goods from distributor 36 for sale within commerce system 30. Retailer 40 uses control system 42 to place orders, control inventory, and schedule deliveries with distributor 26. Retailer 40 sells goods to consumer 44. Consumer 44 patronizes retailer's establishment either in person or by using online ordering. The consumer purchases are entered into control system 42 of retailer 40 as T-LOG data 46.

The purchasing decisions made by consumer 44 drive the manufacturing, distribution, and retail portions of commerce system 30. More purchasing decisions made by consumer 44 for retailer 40 lead to more merchandise movement for all members of commerce system 30. Manufacturer 32, distributor 36, and retailer 40 utilize demand model 48 (similar to model 24), via respective control systems 34, 38, and 42, to control and optimize the ordering, manufacturing, distribution, sale of the goods, and otherwise execute respective business plan 12 within commerce system 30 in accordance with the purchasing decisions made by consumer 44.

Manufacturer 32, distributor 36, and retailer 40 provide historical T-LOG data 46 and supply data 50 to demand model 48 by electronic communication link, which in turn generates forecasts to predict the need for goods by each member and control its operations. In one embodiment, each member provides its own historical T-LOG data 46 and supply data 50 to demand model 48 to generate a forecast of demand specific to its business plan 12. Alternatively, all members can provide historical T-LOG data 46 and supply data 50 to demand model 48 to generate composite forecasts relevant to the overall flow of goods. For example, manufacturer 32 may consider a proposed discounted offer, rebate, promotion, seasonality, or other attribute for one or more goods that it produces. Demand model 48 generates the forecast of sales based on available supply and the proposed price, consumer, rebate, promotion, time, seasonality, or other attribute of the goods. The forecast is communicated to control system 34 by electronic communication link, which in turn controls the manufacturing process and delivery schedule of manufacturer 32 to send goods to distributor 36 based on the predicted demand ultimately determined by the consumer purchasing decisions. Likewise, distributor 36 or retailer 40 may consider a proposed discounted offer, rebate, promotion, or other attributes for one or more goods that it sells. Demand model 48 generates the forecast of demand based on the available supply and proposed price, consumer, rebate, promotion, time, seasonality, and/or other attribute of the goods. The forecast is communicated to control system 38 or control system 42 by electronic communication link, which in turn controls ordering, distribution, inventory, and delivery schedule for distributor 36 and retailer 40 to meet the predicted demand for goods in accordance with the forecast.

Figure 3:
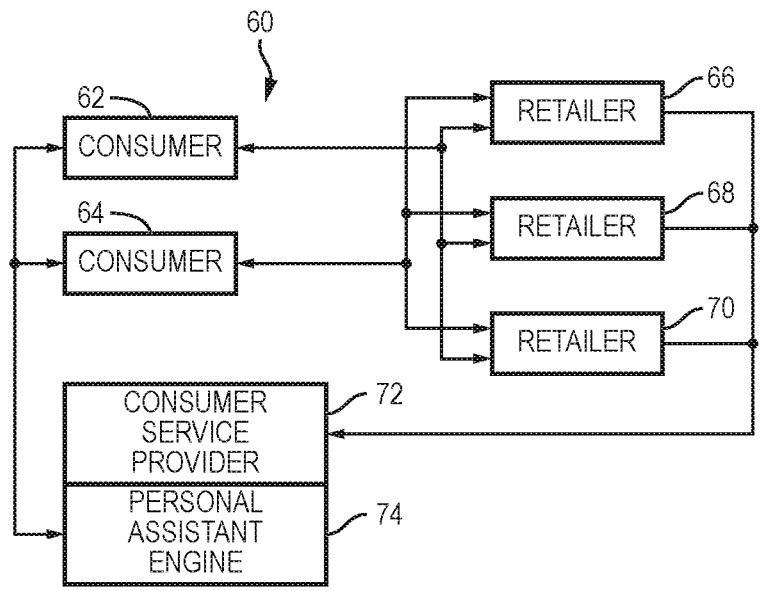
FIG. 3 illustrates commercial transactions between consumers and retailers with the aid of a consumer service provider.

FIG. 3 illustrates a commerce system 60 with consumers 62 and 64 engaged in purchasing transactions with retailers 66, 68, and 70. Retailers 66-70 are supplied by manufacturers and distributors, as described in FIG. 2. Retailers 66-70 are typically local to consumers 62-64, i.e., retailers that the consumers will likely patronize. Retailers 66-70 can also be remote from consumers 62-64 with transactions handled by electronic communication medium, e.g., phone or online website via personal computer, and delivered electronically or by common carrier, depending on the nature of the goods. Consumers 62-64 patronize retailers 66-70 either in person in the retailer's store or by electronic communication medium to select one or more items for purchase from one or more retailers. For example, consumer 62 can visit the store of retailer 66 in person and select product P1 for purchase. Consumer 62 can contact retailer 68 by phone or email and select product P2 for purchase. Consumer 64 can browse the website of retailer 70 using a personal computer and select product P3 for purchase. Accordingly, consumers 62-64 and retailers 66-70 can engage in regular commercial transactions within commerce system 60.

As described herein, manufacturer 32, distributor 36, retailers 66-70, consumers 62-64, and consumer service provider 72 are considered members of commerce system 60. The retailer generally refers to the seller of the product and consumer generally refers to the buyer of the product. Depending on the transaction within commerce system 60, manufacturer 32 can be the seller and distributor 36 can be the buyer, or distributor 36 can be the seller and retailers 66-70 can be the buyer, or manufacturer 32 can be the seller and consumers 62-64 can be the buyer.

Each consumer goes through a product evaluation and purchasing decision process each time a particular product is selected for purchase. Some product evaluations and purchasing decision processes are simple and routine. For example, when consumer 62 is conducting weekly shopping in the grocery store, the consumer sees a needed item or item of interest, e.g., canned soup. Consumer 62 may have a preferred brand, size, and flavor of canned soup. Consumer 62 selects the preferred brand, size, and flavor sometimes without consideration of price, places the item in the basket, and moves on. The product evaluation and purchasing decision process can be almost automatic and instantaneous but nonetheless still occurs based on prior experiences and preferences. Consumer 62 may pause during the product evaluation and purchasing decision process and consider other canned soup options. Consumer 62 may want to try a different flavor or another brand offering a lower price. As the price of the product increases, the product evaluation and purchasing decision process usually becomes more involved. If consumer 62 is shopping for a major appliance, the product evaluation and purchasing decision process may include consideration of several manufacturers, visits to multiple retailers, review of features and warranty, talking to salespersons, reading consumer reviews, and comparing prices. In any case, understanding the consumer's approach to the product evaluation and purchasing decision process is part of an effective model or comparative shopping service. The model must assist the consumer in finding the optimal price and product attributes, e.g., brand, quality, quantity, size, features, ingredients, service, warranty, and convenience, that are important to the consumer and tip the purchasing decision toward selecting a particular product and retailer.

In FIG. 3, consumer service provider 72 is a part of commerce system 60. Consumer service provider 72 is a third party that assists consumers 62-64 with the product evaluation and purchasing decision process by providing access to an optimization model or comparative shopping service. Consumer service provider 72 works with consumers 62-64 and retailers 66-70 to control commercial transactions within commerce system 60 by optimizing the selection of products by price and other attributes. More specifically, consumer service provider 72 operates and maintains personal assistant engine 74 that prioritizes product attributes and optimizes product selection according to the consumer's preferences. In addition, personal assistant engine 74 generates a discounted offer for a product to entice a positive purchasing decision by a specific consumer. The personalized assistant engine 74 saves the consumer considerable time and money by providing access to a comprehensive, reliable, and objective optimization model or comparative shopping service.

Figure 4:
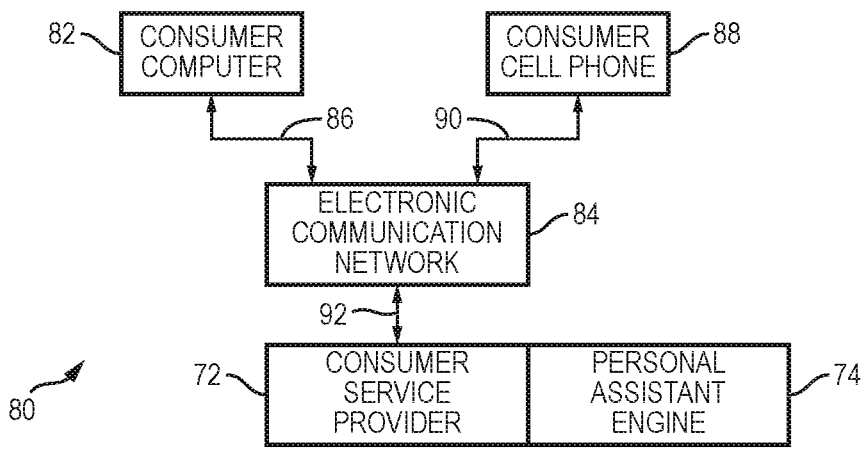
FIG. 4 illustrates an electronic communication network between the consumers and consumer service provider.

The personal assistant engine 74 can be made available to consumers 62-64 via computer-based online website or other electronic communication medium, e.g., wireless cell phone or other personal communication device. FIG. 4 shows an electronic communication network 80 for transmitting information between consumers 62-64, retailers 66-70, and consumer service provider 72. A consumer operating with computer 82 is connected to electronic communication network 84 by way of communication channel or link 86. Likewise, a consumer operating with a cellular telephone or other wireless communication device 88 is connected to electronic communication network 84 by way of communication channel or link 90. The electronic communication network 84 is a distributed network of interconnected routers, gateways, switches, and servers, each with a unique internet protocol (IP) address to enable communication between individual computers, cellular telephones, electronic devices, or nodes within the network. In one embodiment, electronic communication network 84 is a global, open-architecture network, commonly known as the Internet. Communication channels 86 and 90 are bi-directional and transmit data between consumer computer 82 and consumer cell phone 88 and electronic communication network 84 in a hard-wired or wireless configuration. For example, consumer computer 82 has email, texting, and Internet capability, and consumer cell phone 88 has email, texting, and Internet capability.

The electronic communication network 80 further includes consumer service provider 72 with personal assistant engine 74 in electronic communication with network 84 over communication channel or link 92. Communication channel 92 is bi-directional and transmits data between consumer service provider 72 and electronic communication network 84 in a hard-wired or wireless configuration.

Figure 5:
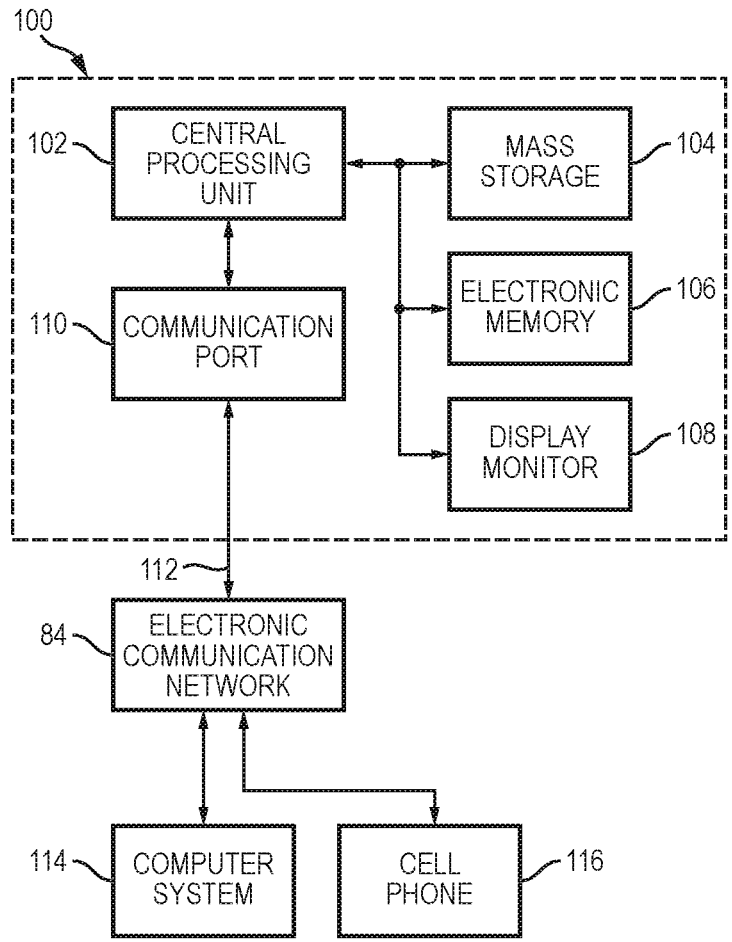
FIG. 5 illustrates a computer system operating with the electronic communication network.

Further detail of the computer systems used in electronic communication network 80 is shown in FIG. 5 as a simplified computer system 100 for executing the software program used in the electronic communication process. Computer system 100 is a general purpose computer including a central processing unit or microprocessor 102, mass storage device or hard disk 104, electronic memory 106, display monitor 108, and communication port 110. Communication port 110 represents a modem, high-speed Ethernet link, wireless, or other electronic connection to transmit and receive input/output (I/O) data over communication link 112 to electronic communication network 84. Computer system or server 114 can be configured as shown for computer 100. Computer system 114 and cellular telephone 116 transmit and receive information and data over communication network 84.

Computer systems 100 and 114 can be physically located in any location with access to a modem or communication link to network 84. For example, computer 100 or 114 can be located in the consumer's home or business office. Consumer service provider 72 may use computer system 100 or 114 in its business office. Alternatively, computer 100 or 114 can be mobile and follow the user to any convenient location, e.g., remote offices, consumer locations, hotel rooms, residences, vehicles, public places, or other locales with electronic access to electronic communication network 84. The consumer can access consumer service provider 72 by mobile application operating in cell phone 116.

Each of the computers run application software and computer programs, which can be used to display user interface screens, execute the functionality, and provide the electronic communication features as described below. The application software includes an Internet browser, local email application, word processor, spreadsheet, and the like. In one embodiment, the screens and functionality come from the application software, i.e., the electronic communication runs directly on computer system 110 or 114. Alternatively, the screens and functions are provided remotely from one or more websites on servers within electronic communication network 84.

The software is originally provided on computer readable media, such as compact disks (CDs), external drive, or other mass storage medium. Alternatively, the software is downloaded from electronic links, such as the host or vendor website. The software is installed onto the computer system hard drive 104 and/or electronic memory 106, and is accessed and controlled by the computer operating system. Software updates are also electronically available on mass storage medium or downloadable from the host or vendor website. The software, as provided on the computer readable media or downloaded from electronic links, represents a computer program product containing computer readable program code embodied in a computer program medium. Computers 100 and 114 run application software for executing instructions for communication between consumers 82 and 88 and consumer service provider 72, gathering product information, generating consumer models or comparative shopping services, and evaluating promotional programs. The application software is an integral part of the control of purchasing decisions within commerce system 60.

The electronic communication network 80 can be used for a variety of business, commercial, personal, educational, and government purposes or functions. For example, the consumer using computer 114 can communicate with consumer service provider 72 operating on computer 100, and the consumer using cellular telephone 116 can communicate with consumer service provider 72 operating on computer 100. The electronic communication network 80 is an integral part of a business, commercial, professional, educational, government, or social network involving the interaction of people, processes, and commerce.

Figure 6:
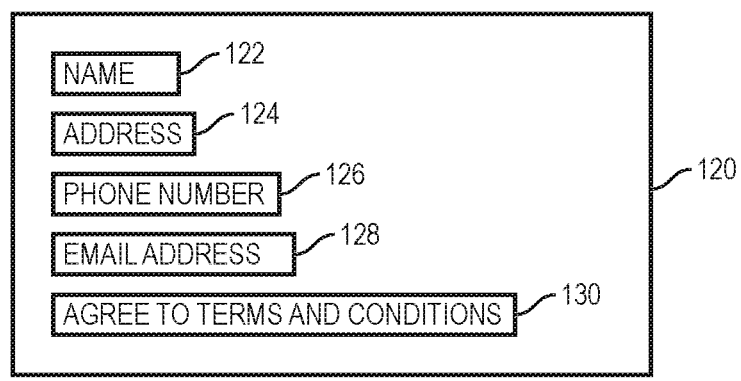
FIG. 6 illustrates a consumer profile registration webpage with the consumer service provider.

To interact with consumer service provider 72, consumers 62 and 64 first create an account and profile with the consumer service provider. Consumers 62 and 64 can use some features offered by consumer service provider 72 without creating an account, but full access requires completion of a registration process. The consumer accesses website 120 operated by consumer service provider 72 on computer system 100 and provides data to complete the registration and activation process, as shown in FIG. 6. The consumer can access website 120 using computer 114 or cellular telephone 116 by typing the uniform resource locator (URL) for website 120, or by clicking on a banner located on another website which re-directs the consumer to a predetermined landing page for website 120. The data provided by the consumer to consumer service provider 72 may include name in block 122, address with zip code in block 124, phone number in block 126, email address in block 128, and other information and credentials necessary to establish a profile and identity for the consumer. The consumer's address and zip code are important as shopping is often a local activity. The consumer agrees to the terms and conditions of conducting electronic communication through consumer service provider 72 in block 130.

Figure 7:
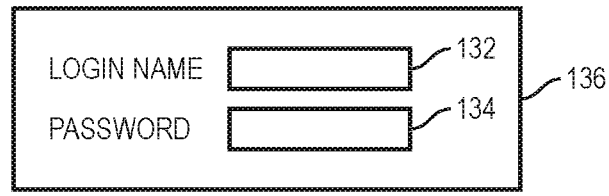
FIG. 7 illustrates a consumer login webpage for the consumer service provider.

The consumer's profile is stored and maintained within consumer service provider 72. The consumer can access and update his or her profile or interact with personal assistant engine 74 by entering login name 132 and password 134 in webpage 136, as shown in FIG. 7. The consumer name can be any personal name, user name, number, or email address that uniquely identifies the consumer and the password can be assigned to or selected by the consumer. Accordingly, the consumer's profile and personal data remains secure and confidential within consumer service provider 72. Once logged in, the consumer can change personal information, update the profile, access personal incentives and other offers, and otherwise interact with personal assistant engine 74.

Figure 8:
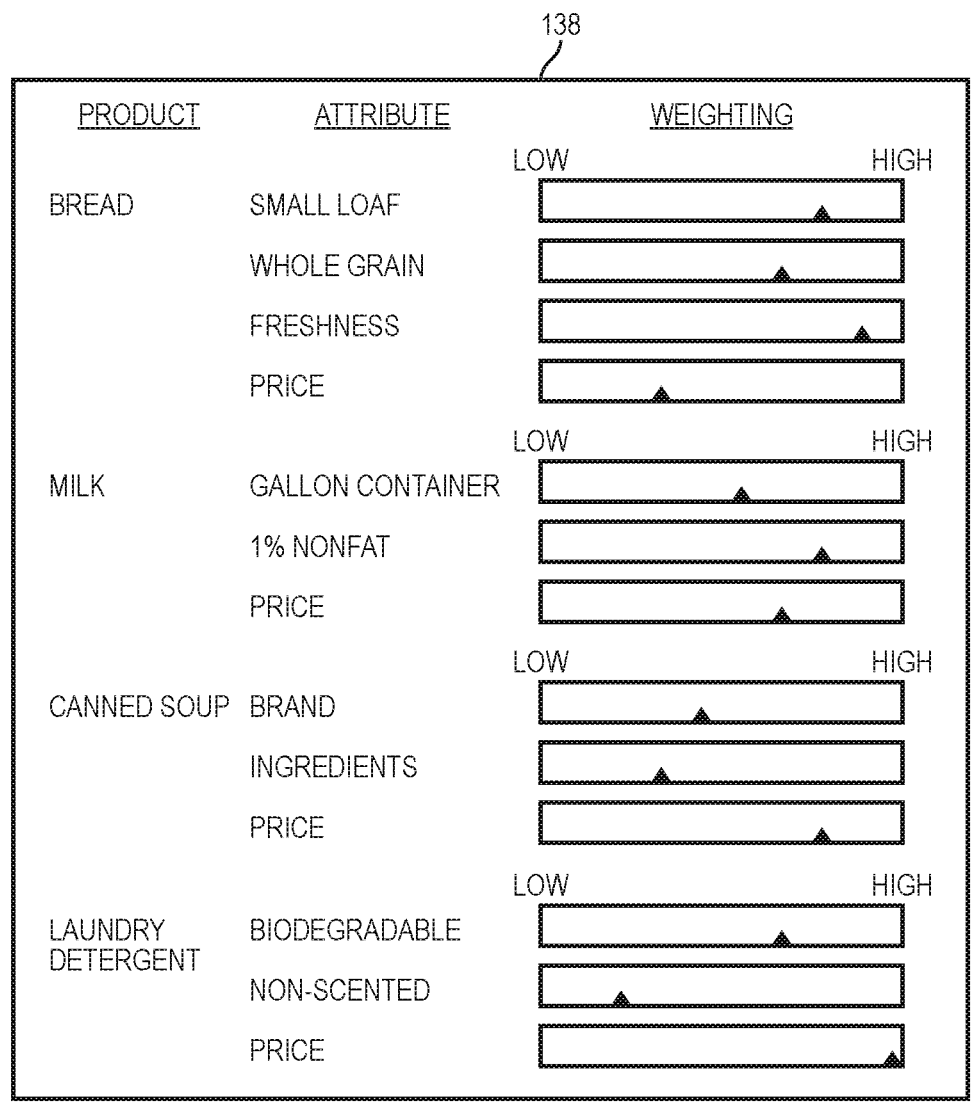
FIG. 8 illustrates a shopping list with preference levels for product attributes defined by the consumer and entered into a personal assistant engine.

One feature of personal assistant engine 74 is webpage 138, as shown in FIG. 8, which allows the consumer to enter a list of products of interest or need, i.e., to create a shopping list. In webpage 138, the consumer can enter commonly purchased or anticipated purchase products. Each product will have product attributes weighted by consumer preference. The consumer weighted attribute values reflect the level of importance or preference that the consumer bestows on each product attribute. Webpage 138 can display a list of available product attributes associated with each product category. Consumer 62 defines one or more product attributes to each product and assigns a weighted preference for each product attribute from 0 (lowest importance) to 9 (highest importance). In one embodiment, the weighted preference is selected with a sliding scale via a computer interface. The sliding scale adjusts the preference level of the product attribute by moving a pointer along the length of the sliding scale. Alternatively, a predetermined value can be selected with a click operation via computer interface. The predetermined values can be 0-9, "always", "never", or other designator meaningful to the consumer. The computer interface can be color coded or otherwise highlighted to assist with assigning a preference level for the product attribute.

The available product attributes can be product-specific attributes, diet/health/nutrient related product attributes, lifestyle related product attributes, environment related product attributes, allergen related product attributes, and social/society related product attributes. The product-specific attributes can include brand, ingredients, size, price, freshness, retailer preference, warranty, and the like. For example, consumer 62 may define the products of interest as bread, milk, canned soup, and laundry detergent. The consumer adds product attributes for each product and, using a sliding scale, assigns a preference level for each product attribute, as shown in webpage 138. The sliding scale adjusts the preference level of the product attribute by dragging a pointer along the length of the sliding scale. In the present example, the consumer preference levels for bread attributes are 7 for small loaf, 6 for whole grain, 8 for freshness, and 3 for price. The consumer preference levels for milk attributes are 5 for gallon container, 7 for 1% low fat, and 6 for price. The consumer preference levels for canned soup attributes are 4 for brand, 3 for product ingredients, and 7 for price. The consumer preference levels for laundry detergent attributes are 6 for biodegradable, 2 for non-scented, and 9 for price.

The consumer can also identify a specific preferred retailer as an attribute with an assigned preference level based on convenience and personal experience. The consumer may assign value to shopping with a specific retailer because of specific products offered by that store, familiarity with the store layout, good consumer service experiences, or location that is convenient on the way home from work, picking up the children from school, or routine weekend errand route.

Personal assistant engine 74 stores the shopping list and weighted product attributes of each specific consumer for future reference and updating. Personal assistant engine 74 can also store prices, product descriptions, names and locations of the retail stores selling the products, offer histories, purchase histories, as well as various rules, policies and algorithms. The individual products in the shopping list can be added or deleted and the weighted product attributes can be changed by the consumer. The shopping list entered into personal assistant engine 74 is specific for each consumer and allows consumer service provider 72 to track specific products and preferred retailers selected by the consumer.

In the business transactions between consumers 62-64 and retailers 66-70, consumer service provider 72 plays an important role in terms of increasing sales for the retailer, while providing the consumer with the most value for the money, i.e., creating a win-win scenario. More specifically, consumer service provider 72 operates as an intermediary between special offers and discounts made available by the retailer and distribution of those individualized offers to the consumers.

Figure 9A:
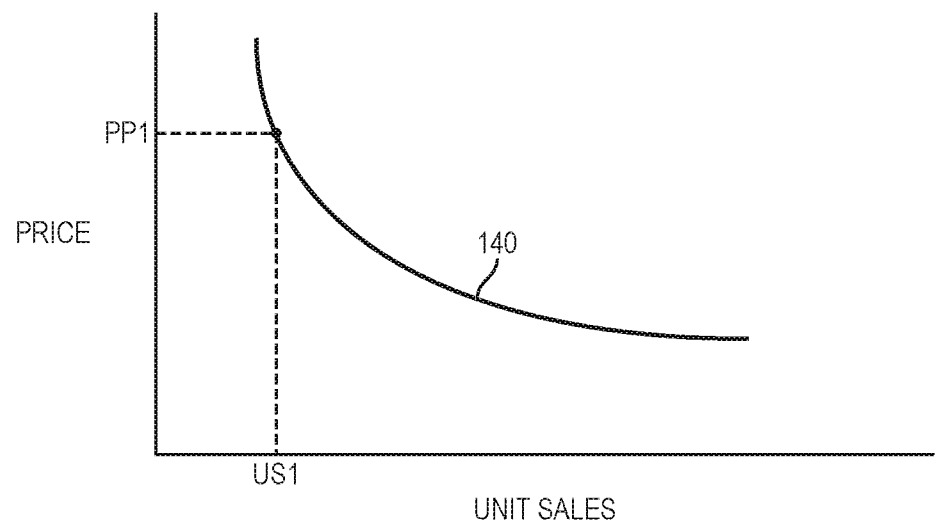
FIGS. 9a-9b illustrate demand curves of price versus unit sales.

To explain the role of consumer service provider 72, first consider demand curve 140 of price versus unit sales, as shown in FIG. 9*a*. In demand curve 140 for a given product P, as price increases, unit sales decrease and, conversely, as price decreases, unit sales increase. At price point PP1, the unit sales are US1. The revenue attained by the retailer is given as PP1*US1. Thus, using a conventional mass marketing strategy as described in the background, if the retailer offers an across the board discounted offer or sale price PP1 to all consumers, e.g., via a newspaper advertisement, then, according to demand curve 140, the expected unit sales will be US1 and the retailer revenue is PP1*US1. That is, those consumers with a purchasing decision threshold of PP1 will buy product P and those consumers with a purchasing decision threshold less than PP1 will not buy product P. The conventional mass marketing approach has missed the opportunity to sell product P at price points below PP1. The retailer loses potential revenue that could have been earned at lower price points.

Figure 9B:
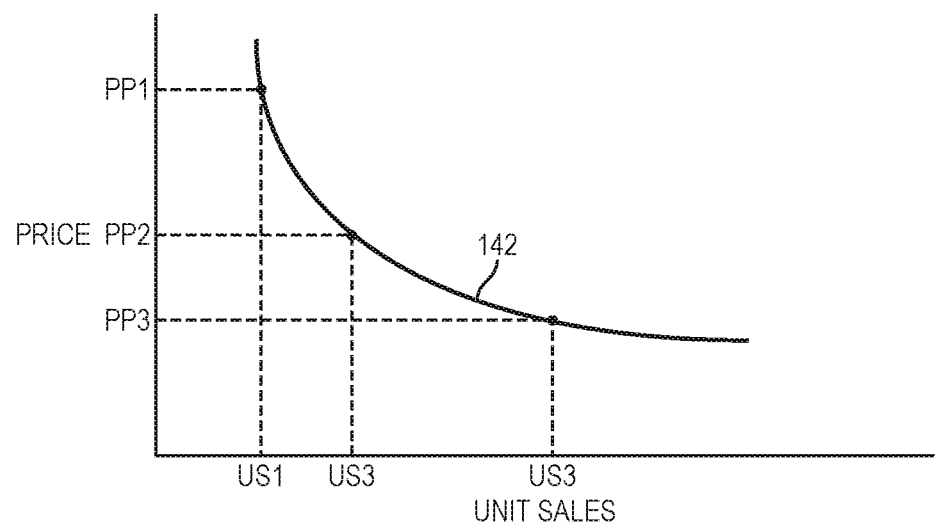

Now consider demand curve 142 in FIG. 9*b* with multiple price points PP1, PP2, and PP3, each capable of generating a profit for the retailer. The number of price points that can be assigned on demand curve 142 differ by as little as one cent, or a fraction of a cent. With a consumer targeted marketing approach, those consumers with a purchasing decision threshold of PP1 will buy product P at that price, those consumers with a purchasing decision threshold of PP2 will buy product P at that price, and those consumers with a purchasing decision threshold of PP3 will buy product P at that price. The retailer now has the potential revenue of PP1*US1+PP2*US2+PP3*US3. Although the profit margins for price points PP2 and PP3 are less than price point PP1, the unit sales US2 and US3 will be greater than unit sales US1. The total revenue for the retailer under FIG. 9*b* is greater than the revenue under FIG. 9*a*.

Under the consumer targeted marketing approach, each individual consumer receives a price point with an individualized discounted offer, i.e., PP1, PP2, or PP3, from the retailer for the purchase of product P. The individualized discounted offer is set according to the individual consumer price threshold that will trigger a positive purchasing decision for product P. The task is to determine an optimal pricing threshold for product P associated with each individual consumer and then make that discounted offer available for the individual consumer in order to trigger a positive purchasing decision. In other words, the individualized discounted offer involves consumer C1 being offered price PP1, consumer C2 being offered price PP2, and consumer C3 being offered price PP3 for product P. Each consumer C1-C3 should make the decision to purchase product P, albeit, each with a separate price point set by an individualized discounted offer. Consumer service provider 72 makes possible the individual consumer targeted marketing with the consumer-specific, personalized "one-to-one" offers as a more effective approach for retailers to maximize revenue as compared to the same discounted price for every consumer under mass marketing. Consumer service provider 72 becomes the preferred source of retail information for the consumer, i.e., an aggregator of retailers capable of providing one-stop shopping for many purchasing options. The individualized discounted offers enable market segmentation to the "one-to-one" level with each individual consumer receiving personalized pricing for a specific product.

In order to generate the consumer model or comparative shopping service, personal assistant engine 74 must have access to comprehensive, reliable, and objective retailer product information. The retailer product information is combined with the consumer's profile and list of products of interest with weighted attributes from webpage 138 to generate an optimized shopping list for a specific consumer with an individualized discounted offer for each product on the list.

Figure 10:
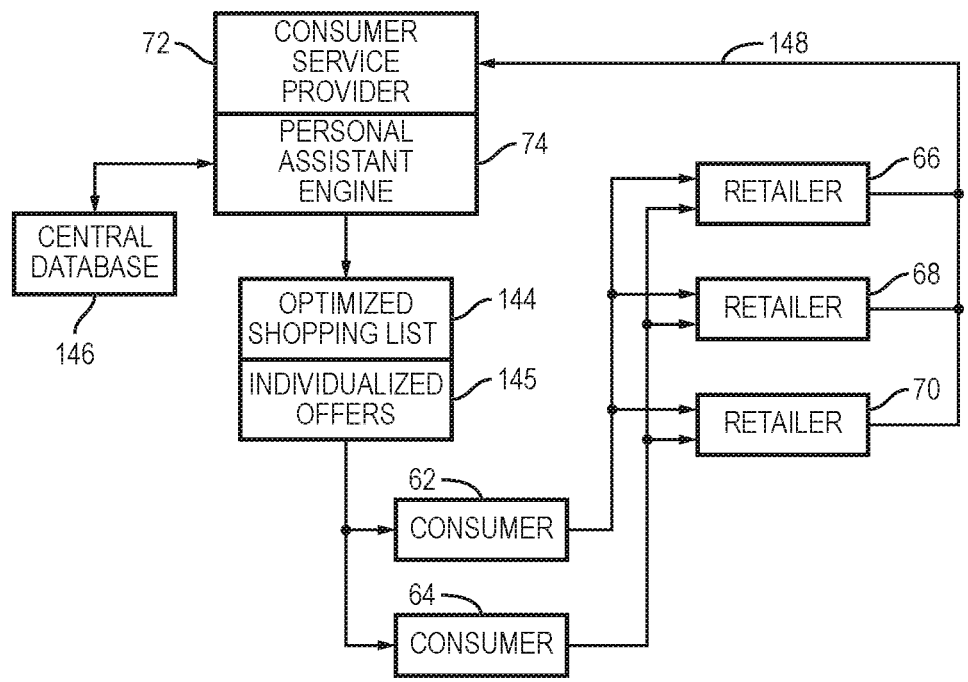
FIG. 10 illustrates interaction between consumers and retailers with the aid of the personal assistant engine to create an optimized shopping list for the benefit of the consumer.

Given the consumer generated shopping list from FIG. 8, personal assistant engine 74 executes a consumer model or comparative shopping service to optimize the shopping list and determine which products should be purchased from which retailers on which day to maximize the value to the consumer as defined by the consumer profile and list of products of interest with weighted attributes from webpage 138. Personal assistant engine 74 also generates for each specific consumer an individualized discounted offer 145 for each product on optimized shopping list 144, as shown in FIG. 10. The individualized discounted offer is crafted for each individual consumer based on a product specific preference value of the consumer weighted attributes, see further discussion below. Each consumer receives an individualized "one-to-one" offer 145. That is, the optimized shopping list for consumer 62 will have an individualized discounted offer 145 for product P1 based on the product specific preference value of the consumer 62 weighted attributes. The optimized shopping list for consumer 64 may have a different individualized discounted offer 145 for the same product P1 based on the product specific preference value of the consumer 64 weighted attributes. The individualized discounted offer 145 should be set to trigger a positive purchasing decision for each consumer. The products that show up on optimized shopping list 144 are the products of interest to the consumer offered at the most valued price.

The consumer patronizes retailers 66-70, either in person or online, with optimized shopping list 144 and individualized discounted offers 145 from personal assistant engine 74 in hand and makes purchasing decisions based on the recommendations on the optimized shopping list. The consumers can rely on personal assistant engine 74 as having produced a comprehensive, reliable, and objective shopping list in view of the consumer's profile and weighted product preferences, as well as retailer product information, that will yield the optimal purchasing decision to the benefit of the consumer. The individualized discounted price should be set to trigger the purchasing decision. Personal assistant engine 74 helps consumers quantify and develop confidence in making a good decision to purchase a particular product from a particular retailer at the individualized "one-to-one" discounted offer 145. While the consumer makes the decision to place the product in the basket for purchase, he or she comes to rely upon or at least consider the recommendations from consumer service provider 72, i.e., optimized shopping list 144 and individualized discounted offers 145 contributes to the tipping point for consumers to make the purchasing decision. The consumer model generated by personal assistant engine 74 thus in part controls many of the purchasing decisions and other aspects of commercial transactions within commerce system 60.

In order to generate the consumer model or comparative shopping service, personal assistant engine 74 must have access to up-to-date, comprehensive, reliable, and objective retailer product information. The retailer product information is combined with the consumer's profile and list of products of interest with weighted attributes from webpage 138, as well as the individualized discounted offers 145, to generate optimized shopping list 144. Consumer service provider 72 maintains a central database 146 of up-to-date, comprehensive, reliable, and objective retailer product information. The product information includes the product description, product attributes, regular retail pricing, and individualized discounted offers that the retailer would be willing to accept for the likelihood of making a sale. Consumer service provider 72 must actively and continuously gather up-to-date product information in order to maintain central database 146. In one approach to gathering product information, retailers 66-70 may grant access to T-LOG data 46 for use by consumer service provider 72. T-LOG data 46 collected during consumer check-out can be sent electronically from retailers 66-70 to consumer service provider 72, as shown by communication link 148 in FIG. 10. As noted in the background, retailers may be reluctant to grant access to T-LOG data 46, particularly without quid pro quo. However, as consumer service provider 72 gains acceptance and consumers 62-64 come to rely on the service to make purchase decisions, retailers 66-70 will be motivated to participate.

Assuming one or more retailers 66-70 choose to grant access to T-LOG data 46, the retailers may also define a maximum retailer acceptable discounted price for each product that can be used by consumer service provider 72 to trigger a positive purchasing decision by consumers 62-64. The maximum retailer acceptable discounted price is typically determined by the retailer's profit margin. If product P costs $1.50 to manufacture, distribute, and sell, and the regular price is $2.50, then the retailer has at most $1.00 in profit to offer as a discount without creating an operating loss. In this case, the maximum retailer acceptable discounted price is $1.00 or less, depending on how much profit margin the retailer is willing to forego in order to make the sale.

Figure 11:
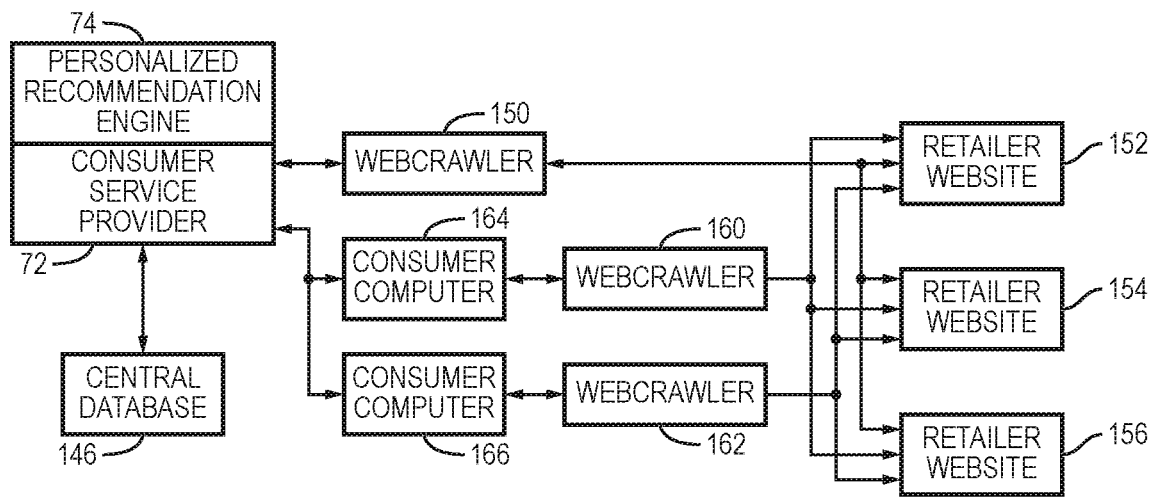
FIG. 11 illustrates collecting product information from retailer websites directly by the consumer service provider or indirectly using consumer computers.

One or more retailers 66-70 may decline to provide access to its T-LOG data for use with personal assistant engine 74. In such cases, consumer service provider 72 can exercise a number of alternative data gathering approaches and sources. In one embodiment, consumer service provider 72 utilizes computer-based webcrawlers or other searching software to access retailer websites for pricing and other product information. In FIG. 11, webcrawler 150 operates within the software of computer 100 or 114 used by consumer service provider 72. Consumer service provider 72 dispatches webcrawler 150 to make requests for product information from websites 152, 154, and 156 of retailers 66, 68, and 70, respectively. Webcrawler 150 collects and returns the product information to personal assistant engine 74 for storage within central database 146. For example, webcrawler 150 identifies products available from each of retailer websites 152-156 and requests pricing and other product information for each of the identified products. Webcrawler 150 navigates and parses each page of retailer websites 152-156 to locate pricing and other product information. The parsing operation involves identifying and recording product description, universal product code (UPC), price, ingredients, size, and other product information as recovered by webcrawler 150 from retailer websites 152-156. In particular, the parsing operation can identify discounted offers and special pricing from retailers 66-70. The discounted pricing can be used in part to formulate the individualized "one-to-one" offers. The product information from retailer websites 152-156 is sorted and stored in central database 146.

Consumer service provider 72 can also dispatch webcrawlers 160 and 162 from computers 164 and 166 used by consumers 62-64, or from consumer cell phone 116, or other electronic communication device, to access and request product information from retailer websites or portals 152-156 or other electronic communication medium or access point. During the registration process of FIG. 6, consumer service provider 72 acquires the IP address of consumer computers 164 and 166, as well as the permission of the consumers to utilize the consumer computer and login to access retailer websites 152-156. Consumer service provider 72 causes webcrawlers 160-162 to be dispatched from consumer computers 164-166 and uses the consumer login to retailer websites 152-156 to access and request product information from retailers 66-70. Webcrawlers 160-162 collect the product information from retailer websites 152-156 through the consumer computer and login and return the product information to personal assistant engine 74 for storage within central database 146. The execution of webcrawlers 160-162 from consumer computers 164-166 distributes the computational work.

For example, the consumer logs into the website of consumer service provider 72 via webpage 136. Consumer service provider 72 initiates webcrawler 160 in the background of consumer computer 164 with a sufficiently low execution priority to avoid interfering with other tasks running on the computer. The consumer can also define the time of day and percent or amount of personal computer resources allocated to the webcrawler. The consumer can also define which retailer websites and products, e.g., by specific retailer, market, or geographic region, that can be accessed by the webcrawler using the personal computer resources. Webcrawler 160 executes from consumer computer 164 and uses the consumer's login to gain access to retailer websites 152-156. Alternatively, webcrawler 160 resides permanently on consumer computer 164 and runs periodically. Webcrawler 160 identifies products available from each of retailer websites 152-156 and requests pricing and other product information for each of the identified products. Webcrawler 160 navigates and parses each page of retailer websites 152-156 to locate pricing and other product information. The parsing operation involves identifying and recording product description, UPC, price, ingredients, size, and other product information as recovered by webcrawler 160 from retailer websites 152-156. In particular, the parsing operation can identify discounted offers and special pricing from retailers 66-70. The discounted pricing can be used in part to formulate the individualized "one-to-one" discounted offers. The product information from retailer websites 152-156 is sorted and stored in central database 146.

Likewise, webcrawler 162 uses consumer computer 166 and login to gain access to retailer websites 152-156. Webcrawler 162 identifies products available from each of retailer websites 152-156 and requests pricing and other product information for each of the identified products. Webcrawler 162 navigates and parses each page of retailer websites 152-156 to locate pricing and other product information. The parsing operation involves identifying and recording product description, UPC, price, ingredients, size, and other product information as recovered by webcrawler 162 from retailer websites 152-156. In particular, the parsing operation can identify discounted offers and special pricing from retailers 66-70. The discounted pricing can be used in part to formulate the individualized "one-to-one" discounted offers. The product information from retailer websites 152-156 is sorted and stored in central database 146. The product information can be specific to the consumer's login. Retailers 66-70 are likely to accept product information requests from webcrawlers 160-162 because the requests originate from consumer computers 164-166 by way of the consumer login to the retailer website.

Consumer service provider 72 can also collect product information from discounted offers transmitted from retailers 66-70 directly to consumers 62-64, e.g. by email or cell phone 116. Consumer 62-64 can make the personalized discounted offers and other product information available to consumer service provider 72.

Figures 12, 13:
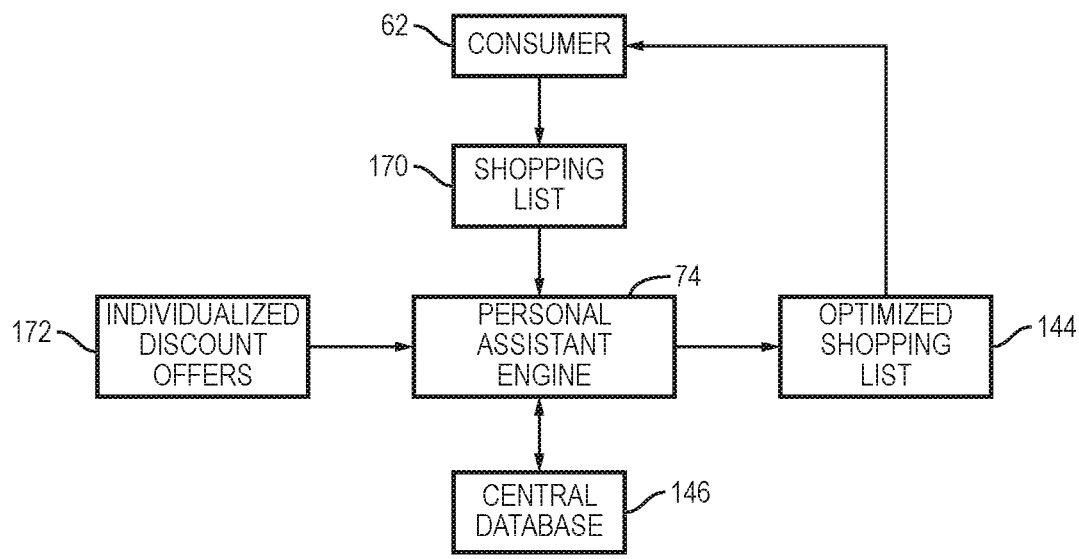
FIG. 12 illustrates comparison of consumer weighted product attributes and retailer product information.
FIG. 13 illustrates generation of an individualized discount for a specific consumer.

With the retailer product information collected and stored in central database 146, personal assistant engine 74 generates optimized shopping list 144 by considering each line item of the consumer's shopping list from webpage 138 and reviewing retailer product information in the central database to determine how to best align each item to be purchased with the available products from the retailers. In addition, personal assistant engine 74 determines the individualized "one-to-one" discounted offer, if any, that will be associated with each line item in shopping list 170, as shown in FIG. 12. For example, a particular consumer 62 wants to purchase bread and has provided shopping list 170 with preference levels for weighted product attributes for bread that are important to his or her purchasing decision. Central database 146 contains bread product descriptions, bread product attributes, and pricing for each retailer 66-70. Personal assistant engine 74 reviews the product attributes of each bread product offered by each retailer 66-70, as stored in central database 146.

The product attributes of each bread product for retailers 66-70 in central database 146 are compared to the consumer-defined weighted product attributes in shopping list 170 by personal assistant engine 74. For example, the available bread products from retailer 66 are retrieved and compared to the weighted attributes of consumer 62. Likewise, the available bread products from retailer 68 are retrieved and compared to the weighted attributes of consumer 62, and the available bread products from retailer 70 are retrieved and compared to the weighted attributes of consumer 62. Consumer 62 wants a small loaf with preference level of 7. Those retailers with small loaf bread receive credit or points weighted by the preference level for meeting the consumer's attribute. Otherwise, the retailers receive no credit or points, or less credit or points, because the product attribute does not align or is less aligned with the consumer weighted attribute. Consumer 62 wants whole grain with preference level of 6. Those retailers with whole grain bread receive credit or points weighted by the preference level for meeting the consumer's attribute. Otherwise, the retailers receive no credit or points, or less credit or points, because the product attribute does not align or is less aligned with the consumer weighted attribute. Consumer 62 wants freshness with preference level of 8. Those retailers with fresh bread (say no more than 2 days old) receive credit or points weighted by the preference level for meeting the consumer's attribute. Those retailers with bread more than 2 days old receive less credit or points because the product attribute does not align or is less aligned with the consumer weighted attribute. Consumer 62 wants best pricing with preference level of 3. Those retailers with the lowest net price (regular price minus individualized discount for consumer 62) receive the most credit or points weighted by the preference level for being the closest to meeting the consumer's attribute. Those retailers with higher net prices receive less credit or points because the product attribute does not align or is less aligned with the consumer weighted attribute.

With respect to pricing, each retailer has two price components: regular price and individualized discounted offers from the regular price that are variable over time and specific to each consumer. The net price to consumer 62 is the regular price less the individualized discounted offer for that consumer. To determine optimal individualized discount needed to achieve a positive consumer purchasing decision for product P from consumer 62, personal assistant engine 74 considers the individualized discounts from each retailer 66-70. In one embodiment, the individualized discount can be a default discount determined by the retailer or personal assistant engine 74 on behalf of the retailer. The default discount is defined to provide a reasonable profit for the retailer as well as reasonable likelihood of attaining the first position on optimized shopping list 144, i.e., the default discounted offer is selected to be competitive with respect to other retailers.

FIG. 13 shows three possible choices for the consumer requested bread product from retailers 66-70, as ascertained from central database 146. Bread brand BB1 from retailer 66 is shown with BB1 product attributes, e.g., small loaf, not whole grain, 3 day freshness, and discounted price of $3.00 (regular price of $4.00 less 1.00 default discounted offer from retailer 66). The "Consumer Value" column shows the value to consumer 62 based on alignment of the BB1 product attributes and the weighted product attributes as defined by the consumer. The BB1 product gets attributes points AP1 for small loaf, no attributes points AP2 for not being whole grain, attribute points AP3 for 3 day freshness, and attributes points AP4 for the $3.00 discounted price. The consumer value (CV) is summation of assigned attributes points for alignment between the product attributes and the weighted product attributes as defined by the consumer times the preference level (normalized by 10) for the weighted product attributes, i.e., AP1*0.7+AP2*0.6+ AP3*0.8+AP4*0.3. Assume that the BB1 product gets CV of $2.50 USD. The consumer value CV is given in a recognized monetary denomination, such as US dollar (USD), Canadian dollar, Australian dollar, Euro, British pound, Deutsche mark, Japanese yen, and Chinese yuan.

Consumer value CV can also be determined by equation (1) as follows:

$$CV = CV_b \Pi_a(M_a) \quad (1)$$

where: $CV_b$ is a baseline product value of the product category, and $M_a$ is the product attribute value to the consumer for product attribute a expressed as (1+x %), where x is a percentage increase in value of the product to the consumer having the attribute a with respect to products having no product attribute a.

The "Final Price" column shows the final price (FP) offered to the consumer, i.e., regular price less the default discount from retailer 66 ($4.00−1.00=3.00). The "Net Value" column is the net value or normalized value (NV) of the BB1 product to consumer 62. In one embodiment, the net value is the consumer value normalized by the final price, i.e., NV=CV/FP. Alternatively, the net value is determined by NV=(CV−FP)/CV. Using the first normalizing definition, NV=2.50/3.00=0.83. The consumer value CV is less than the final price FP offered by retailer 66, including the default discount. The net value NV to consumer 62 is less than one so the BB1 product will not be a good choice for the consumer. Using the second normalizing definition, NV= (2.50−3.00)/2.50=−0.20. The net value NV to consumer 62 is negative so the BB1 product will not be a good choice for the consumer. Consumer 62 is unlikely to buy the BB1 product because the product attributes do not align or match well with the consumer weighted attributes, taking into account the individualized discounted offer. A net value NV less than one or negative indicates that retailer 66 would likely not receive a positive purchasing decision from consumer 62. Personal assistant engine 74 should not recommend the BB1 product to consumer 62 in optimized shopping list 144.

Bread brand BB2 from retailer 68 is shown with BB2 product attributes, e.g., not small loaf, whole grain, 2 day freshness, and pricing of $2.60 (regular price of $3.25 less 0.65 discounted offer from retailer 68). The BB2 product gets no attributes points AP5 for not being a small loaf, attributes points AP6 for whole grain, attribute points AP7 for 2 day freshness, and attributes points AP8 for the $2.60 price. The consumer value is AP5*0.7+AP6*0.6+AP7*0.8+ AP8*0.3. Assume that the BB2 product gets CV of $3.10 USD. The final price FP is the regular price less the default discount from retailer 68 ($3.25−0.65=2.60). Using the first normalizing definition, NV=3.10/2.60=1.19. The net value NV to consumer 62 is greater than one so the BB2 product is a possible choice for the consumer. Using the second normalizing definition, NV=(3.10−2.60)/3.10=+0.16. The net value NV to consumer 62 is positive so the BB2 product is a possible choice for the consumer.

Bread brand BB3 from retailer 70 is shown with BB3 product attributes, e.g., small loaf, whole grain, 1 day freshness, and pricing of $2.30 (regular price of $3.20 less 0.90 discounted offer from retailer 70). The BB3 product gets attributes points AP9 for small loaf, attributes points AP10 for whole grain, attributes points AP11 for 1 day freshness, and attributes points AP12 for the $2.40 price. The consumer value is AP9*0.7+AP10*0.6+AP11*0.8+AP12*0.3. Assume that the BB3 product gets CV of $3.40 USD. The final price FP is the regular price less the default discount ($3.20−0.90=2.30). Using the first normalizing definition, NV=3.40/2.30=1.48. The net value NV to consumer 62 is greater than one so the BB3 product is a possible choice for consumer 62. Using the second normalizing definition, NV=(3.40−2.30)/3.40=+0.32. The net value NV to consumer 62 is positive so the BB3 product is a possible choice for the consumer. In fact, based on the default discounted offer from retailers 66-70, the net value of the BB3 product (NV=1.48) is higher than the net value of the BB2 product (NV=1.19) or BB1 product (NV=0.83). The BB3 product is placed on optimized shopping list 144. The BB3 product is the optimal choice for consumer 62 in that if the consumer needs to purchase a bread product, then BB3 is the product most closely aligned with the consumer weighted attributes, i.e., highest net value NV, and would likely receive a positive purchasing decision from consumer 62.

In another embodiment, multiple brands and/or retailers for a single product can be placed on optimized shopping list 144. Personal assistant engine 74 can place, say the top two or top three net value brands and/or retailers on optimized shopping list 144, and allow the consumer to make the final selection and purchasing decision. In the above example, the BB3 product could be placed in first position on optimized shopping list 144 and the BB2 product would be in second position on the optimized shopping list.

The optimal discounted offer tipping point ($P_{TIP}$) for consumer 62 to make a positive purchasing decision between two products can be determined according to $P_{TIP}=CV_K-CV_K*(CV_I-P_I)/CV_I$, where $CV_K$ is the consumer value of product K, $CV_I$ is the consumer value of product I, and $P_I$ is the price of product I.

The optimized individualized discounted offer is in part a competitive process between retailers. Since the consumer needs to purchase the product from someone, the price tipping point for consumers may involve a comparison of the best available price from competing retailers. In a variation of the previous example, the optimal individualized discounted offer needed to achieve a positive consumer purchasing decision for the product from consumer 62 involves a repetitive process beginning with the regular price less the default discount and then incrementally increasing the individualized discounted offer until the winning retailer is determined. Continuing from the previous example, retailer 68 currently in second position may want to be in first position on optimized shopping list 144. Retailer 68 authorizes personal assistant engine 74 to increase the individualized discounted offer to consumer 62 as necessary to achieve that position. Personal assistant engine 74 increases the individualized discounted offer from retailer 68 by as little as one cent, or fraction of one cent, and recalculates the net value NV to consumer 62. If retailer 68 remains in second position, the discounted offer is incremented again and the net value NV is recalculated. The incremental increases in the individualized discounted offer from retailer 68 continue until retailer 68 achieves first position over retailer 70 on optimized shopping list 144, or until retailer 68 reaches its maximum retailer acceptable discount. The maximum retailer acceptable discount is defined by the retailers based on the profit margin for the product. Retailer 68 will not exceed its maximum retailer acceptable discount as to do so would result in no profit or a loss on the transaction.

If retailer 68 reaches first position over retailer 70 on optimized shopping list 144, then retailer 70 may authorize personal assistant engine 74 to increase its individualized discounted offer to consumer 62 as necessary to regain first position. Personal assistant engine 74 increases the discounted offer from retailer 70 by as little as one cent, or fraction of one cent, and recalculates the net value NV to consumer 62. If retailer 70 remains in second position, the discounted offer is incremented again and the net value NV is recalculated. The incremental increases in the individualized discounted offer from retailer 70 continue until retailer 70 regains first position over retailer 68 on optimized shopping list 144, or until retailer 70 reaches its maximum retailer acceptable discount. Retailer 70 will not exceed its maximum retailer acceptable discount as to do so would result in no profit or a loss on the transaction.

If retailer 70 regains first position over retailer 68 on optimized shopping list 144, then retailer 68 may authorize personal assistant engine 74 to increase its individualized discounted offer to consumer 62 as necessary to regain first position. Retailers 68 and 70 continue jockeying for first position until retailer 68 or 70 reaches its maximum retailer acceptable discount or otherwise withdraws from the competition. In the end, one retailer will be able to make a discounted offer to consumer 62 that achieves first position on optimized shopping list 144 without exceeding its maximum retailer acceptable discount and will remain as winner of the first position. While driving the individualized discount toward the maximum retailer acceptable discount may lead to a winner of the first position among competing retailers, it generally does not result in an individualized discounted offer that is the least discount that the retailer must offer to receive a positive purchasing decision from the consumer.

In another example, the optimal individualized discount needed to achieve a positive consumer purchasing decision for the product from consumer 62 involves a repetitive process beginning with the regular price, or the regular price less the default discount or some initial discount, and then incrementally increasing the individualized discounted offer until the optimal individualized discount is determined. In this case, assume personal assistant engine 74 begins with the regular price for each retailer 66-70. The net value NV is determined for the BB1-BB3 products, as described above, based on the final price FP equal to the regular price for the respective products. The occurrence of a net value NV less than one or negative for particular retailers is not dispositive as the individualized discounted offers have not yet been considered. Personal assistant engine 74 may run the net value calculations based on the regular price to determine the retailer with the highest net value NV for consumer 62. The highest net value retailer based on the regular price is tentatively in first position, although the discounted offer optimization process is just beginning. Personal assistant engine 74 makes a first individualized discounted offer on behalf of each retailer 66-70 and calculates the net value NV for consumer 62, as described above, for each of the BB1-BB3 products. The initial individualized discounted offer can be the default discount for the retailer, or a smaller incremental discount as little as one cent or fraction of one cent. Based on the initial individualized discounted offer, one retailer is determined to provide the highest net value NV for consumer 62. The individualized discounted offer optimization may stop there and the winning retailer will be in first position on optimized shopping list 144. Alternatively, retailers 66-70 authorize personal assistant engine 74 to increment their respective individualized discounted offer to consumer 62. The retailers that did not attain the coveted first position on optimized shopping list 144 after the initial individualized discount may want to continue bidding for that spot. Those retailers that choose to can incrementally increase their respective individualized discounted offer and personal assistant engine 74 recalculates the net value NV to consumer 62, as described above. Based on the revised individualized discounted offer, one retailer is determined to provide the highest net value NV for consumer 62 and will assume or retain first position on optimized shopping list 144.

If the competition among retailers for best net value continues, the retailers will likely drive each other toward the maximum retailer acceptable discount, which minimizes profit for the retailers. That is, the retailers will continue increasing the individualized discounted offer as they compete for first position until further discounts cannot practically be made. To avoid this eventuality, personal assistant engine 74 can set a limit on the number of incremental passes. If a competition among retailers arises, personal assistant engine 74 may limit the number of iterations to, say two or three passes, and let the highest net value retailer after the maximum allowable passes be finally placed in first position on optimized shopping list 144. Retailers 66-70 will make their best offers within the allowable number of iterations and live with the result. Otherwise, without some failsafe in the computer-driven reality of personal assistant engine 74, where the controlling factor is which competing retailer gets to be in first position on optimized shopping list 144, the individualized discounted offer optimization will necessarily drive down the final price toward the maximum retailer acceptable discount. That is, the individualized discounted offer from the winning retailer will not be the smallest discount that would achieve a positive purchasing decision from consumer 62, but rather the final individualized discounted offer would be that which is necessary to place the winning retailer in first position on optimized shopping list 144 over the other competing retailers. Retailers 66-70 and consumer service provider 72 would needlessly lose profit.

In another consideration of optimizing the individualized discounted offer, blindly continuing to increase the individualized discounted offers does not necessarily collectively benefit the retailers. If retailer 68 continues to increase the individually discounted offer in competition with retailer 70, but retailer 68 never reaches or even comes close to first position, the reason can be that the product attributes of retailer 68 are not as well aligned with the consumer weighted attributes as are the product attributes of retailer 70. The net value NV is in part a function of the alignment of the product attributes and the consumer weighted attributes. Retailer 68 will never gain first position over the competing retailer 70 because the product attributes of retailer 70 are better positioned for the purchasing decision by consumer 62. While retailer 68 may not care that he or she is hopelessly driving down the profit for retailer 70 in bidding for first position of the subject product, retailer 68 will care when the alignment roles are reversed for another product on the shopping list of consumer 62 or on another consumer's shopping list. In the role reversal for another product, retailer 70 will be hopelessly driving down the profit of retailer 68. In addition, while blindly increasing the individualized discounted offer may achieve first position for the retailer on optimized shopping list 144, it may fail to set the final price at a profit optimizing level. That is, the individualized discounted offer from the winning retailer may not be the smallest discount that would achieve a positive purchasing decision from consumer 62, but rather the final individualized discounted offer would be that which is necessary to place the winning retailer in first position on optimized shopping list 144 over other competing retailers. Consumer 62 may benefit from the blind competition, but the retailers are needlessly reducing each other's profitability. Accordingly, if after a predetermined number of iterations, and retailer 68 is not making progress in taking over first position from retailer 70, further incremental individualized discounted offers from retailer 68 are suspended. Retailer 70 can assume the foregone conclusion of first position on optimized shopping list 144 while still retaining as much profit as possible in view of the competitive process.

In yet another example, the optimal individualized discount needed to achieve a positive consumer purchasing decision for the product from consumer 62 involves a repetitive process beginning with the regular price less the maximum retailer acceptable discount and then incrementally decreasing the individualized discounted offer, i.e., raising the final price FP for the product, until the optimal individualized discount is determined. In this case, assume personal assistant engine 74 begins with the regular price less the maximum retailer acceptable discount for each retailer 66-70. The net value NV is determined for the BB1-BB3 products, as described above, based on the final price FP equal to the regular price less the maximum retailer acceptable discount for the respective products. The highest net value retailer based on the regular price less the maximum retailer acceptable discount is tentatively in first position.

Retailers 66-70 do not necessarily want to offer every consumer 62-64 the maximum retailer acceptable discount as that would minimize profit for the retailer. Personal assistant engine 74 must determine the price tipping point for consumer 62 to make a positive purchasing decision, i.e., the lowest individualized discounted price that would entice the consumer to purchase one product. Any product with a net value less than one or negative net value given the maximum retailer acceptable discount is eliminated because there is no practical discount, i.e., a discount that still yields a profit for the retailer, that the retailer could offer which would entice consumer 62 to purchase the product. As for the other products, personal assistant engine 74 incrementally modifies the individualized discounted offer to a value less than the maximum retailer acceptable discount, i.e., raises the final price FP (regular price minus the individualized discount) to consumer 62. The modified individualized discounted offer can be a lesser incremental discount, e.g., the default discount or as little as one cent or fraction of one cent less than the maximum retailer acceptable discount. Personal assistant engine 74 recalculates the net value NV for consumer 62, as described above, for each of the remaining BB1-BB3 products (except for eliminated products) at the modified final price point. Based on the modified individualized discounted offer, one retailer is determined to provide the highest net value NV greater than one or positive for consumer 62. The highest net value retailer based on the regular price less the modified individualized discounted offer moves into or retains first position.

Retailers 66-70 authorize personal assistant engine 74 to continue to increment their respective individualized discounted offer to a lesser value and higher final price FP to consumer 62 in moving toward the optimal individualized discount. Personal assistant engine 74 recalculates and tracks the net value of the BB1-BB3 products to consumer 62 during each bidding round of modifying the individualized discounted offers. As the final price FP increases with the lesser discounted offers, the net value for the BB1-BB3 products will one-by-one become less than one or negative using the first and second normalizing definitions, respectively. In other words, at some point in the bidding rounds, the net value of one of the BB1-BB3 products will become less than one or negative. The net value of another BB1-BB3 product will become less than one or negative in the same bidding round or at a later bidding round. The last standing BB1-BB3 product with a net value greater than one or positive, i.e., with the other products having been eliminated or otherwise have dropped out of the competition, is the winning retailer. The last standing BB1-BB3 product with the least individualized discounted offer still yields a net value greater than one or positive value is the price tipping point for consumer 62 to make a positive purchasing decision for one product, i.e., the least individualized discounted offer that would entice the consumer to purchase one product. The winning retailer with the highest net value using the least individualized discounted offer is selected as the best value for consumer 62 and is placed in first position on optimized shopping list 144.

Alternatively, using the maximum retailer acceptable discount as the starting point, personal assistant engine 74 can set a predetermined number of iterations, say two or three passes, before declaring the winning retailer, or one or more retailers may stop further bidding if progress is not being made in moving the retailer into first position. Personal assistant engine 74 can also determine when the relative positions of the retailers in the field are not changing and declare the bidding over. The BB1-BB3 product with the highest net value greater than one or positive value is the optimal price tipping point for consumer 62 to make a positive purchasing decision for the product. The winning retailer is placed in first position on optimized shopping list 144.

In each of the above examples of determining net value for consumer 62, multiple brands and/or retailers for a single product can be placed on optimized shopping list 144. Personal assistant engine 74 can place, say the top two or top three net value brands and/or retailers on optimized shopping list 144, and allow the consumer to make the final selection and purchasing decision.

FIG. 14 shows optimized shopping list 144 with the BB3 product from retailer 70. The above process is repeated for milk brands MB1, MB2, and MB3, canned soup brands SB1, SB2, and SB3, and detergent brands DB1, DB2, and DB3 based on the product information in central database 146, preference levels for the consumer weighted product attributes, and lowest individualized discount that will result in a positive purchasing decision. The best value product brand for consumer 62 is placed on optimized shopping list 144. In this case, the MB2 product from retailer 68 (NV=1.15), the SB3 product from retailer 70 (NV=1.12), and the DB1 product from retailer 66 (NV=1.10) are determined to be the best value product brand for consumer 62 and are placed on optimized shopping list 144. The other products from retailers 66-70 had a net value less than one or a net value greater than one but less than that of the winning retailer. Based on optimized shopping list 144, consumer 62 patronizes the BB3 product from retailer 70, MB2 product from retailer 68, SB3 product from retailer 70, and DB1 product from retailer 66. The optimized shopping list 144 gives consumer 62 the ability to evaluate one or more recommended products, each with an individualized discount customized for consumer 62 to make a positive purchasing decision.

Another optimized shopping list 144 is generated for consumer 64 by repeating the above process using the preference levels for the weighted product attributes as defined by consumer 64. The optimized shopping list 144 for consumer 64 gives the consumer the ability to evaluate one or more recommended products, each with an individualized discount customized for consumer 64 to make a positive purchasing decision. The discounted offer is individualized for each specific consumer 62-64 in that the discount is determined according to the individual consumer price threshold that will trigger a positive purchasing decision for that consumer. The recommended products are objectively and analytically selected from a myriad of possible products from competing retailers according to the consumer weighted attributes. Consumers 62-64 will develop confidence in making a good decision to purchase a particular product from a particular retailer.

Consumers 62-64 can identify the choice of retailers as an attribute. The retailer attribute is a consumer-defined preference level. The consumer may assign value to shopping with a specific retailer because of specific products offered by that store, familiarity with the store layout, good consumer service experiences, or location that is convenient on the way home from work, picking up the children from school, or routine weekend errand route.

Retailers 66-70 will want to show up as the recommended source for as many products as possible on optimized shopping list 144. Primarily, a particular retailer will be the optimized product source when the combination of the individualized discounted price and product attributes offered by the retailer aligns with, or provides maximum net value for the consumer in accordance with, the consumer's profile and shopping list with weighted preferences. Retailers 66-70 can enhance their relative position and provide support for consumer service provider 72 by making T-LOG data 46 available to consumer service provider 72. One way to get a high score when comparing retailer product attributes to the consumer-defined weighted product attributes is to ensure that personal assistant engine 74 has access to the most accurate and up-to-date retailer product attributes via central database 146. Even though a given retailer may have a product with desirable attributes, personal assistant engine 74 cannot record a high score if it does not have complete information about the retailer's products. By giving consumer service provider 72 direct access to T-LOG data 46, the retailer makes the product information readily available to personal assistant engine 74 which will hopefully increase its score and provide more occurrences of the retailer being the recommended source on optimized shopping list 144. While the use of webcrawlers in FIG. 11 is effective in gathering product information from retailer websites 152-156, direct access to retailer T-LOG data 46 will further aid the consumers in generating optimized shopping list 144.

The optimized shopping list 144 with individualized discounts can be transferred from consumer computers 164-166 to cell phone 116. Consumers 62-64 patronize retailers 66-70, each with optimized shopping list 144 from personal assistant engine 74 in hand and make purchasing decisions based on the recommendations on the optimized shopping list. The individualized discounted prices are conveyed to retailers 66-70 by electronic communication from cell phone 116 to the retailer's check-out register. The discounted pricing can also be conveyed from consumer computer 164-166 directly to retailers 66-70 and redeemed with a retailer loyalty card assigned to the consumer. Retailers 66-70 will have a record of the discounted offers and the loyalty card will match the consumer to the discounted offers on file. In any case, consumers 62-64 each receive an individualized discounted offer as set by personal assistant engine 74.

Consumer service provider 72 can generate an optimized shopping list based on the preference of consumer 62 to patronize a limited number of retailers 66-70. Shopping is a time consuming and expense driven activity with associated costs to consumer 62. The associated costs, such as gas, childcare while shopping, time, aggravation with crowds, inconvenience of traveling to multiple retailers, and potential that the product might be out-of-stock at the retailer having the lower price, can be a significant component in the purchasing decision. Consumer 62 may be unwilling to drive additional distance to another retailer and deal with the long check-out lines just to save a relatively small amount on one product, assuming the other retailer even has the product in stock.

In other cases, retailer 66 may want to incentivize consumer 62 to conduct most if not all their shopping at the retailer's store, i.e., retailers want to encourage one-stop shopping to their store and receive the revenue from all of the products on the shopping list. Retailer 66 may utilize a loss leader marketing approach by selling certain products at below-cost pricing with the expectation of making up the lost profit on other products purchased by consumer 62 at regular or higher margin.

Consumer service provider 72 generates one or more optimized shopping lists with all of the products on the list directed exclusively to one retailer. The optimized shopping list represents an aggregation of the consumer's purchasing needs directed toward one retailer or a limited number of retailers. If the optimized shopping list is generated at the request of consumer 62, then consumer service provider 72 generates a first optimized shopping list 174 with all products on the shopping list directed to retailer 66 in FIG. 15a, second optimized shopping list 176 with all products on the shopping list directed to retailer 68 in FIG. 15b, and third optimized shopping list 178 with all products on the shopping list directed to retailer 70 in FIG. 15c. While consumer service provider 72 has knowledge of total shopping list, each retailer 66-70 is competing for designation as the sole source for all of the products identified by consumer 62 for purchase. That is, each retailer is grabbing as many sales or as big of a share of the optimized shopping list as possible from other retailers.

Consumer service provider 72 uses the individualized discounted offers 145 from retailer 66 for optimized shopping list 174, individualized discounted offers 145 from retailer 68 for optimized shopping list 176, and individualized discounted offers 145 from retailer 70 for optimized shopping list 178. Each retailer can match lower individualized discounted offers from the other retailers. The net value NV can be based on the aggregation of products on the optimized shopping list. That is, an average net value NV for the aggregated products influences the decision for consumer 62 to purchase all of the product from one retailer 66-70.

To entice consumer 62 to accept its optimized shopping list, retailers 66-70 may each make further discounts of the individualized offers, even greater than the maximum discount. Retailers 66-70 may offer certain products at a loss, i.e., no margin or less than cost, but will make up the difference based on other products on the shopping list having a higher margin under a loss leader approach. Retailers 66-70 determine the amount of the discounts based on the total value of the shopping list. The optimized shopping list represents a bundle or aggregation of products that consumer 62 is likely to purchase. Retailers 66-70 can offer more discounts on a $300 shopping list than a $100 shopping list. Retailers 66-70 can also offer more discounts on a shopping list containing higher margin products. Accordingly, the discounts offered by retailers 66-70 on optimized shopping lists 174-178 are tiered based on number of products in the shopping list, total amount or value of the shopping list, and margin of individual products on the shopping list. Retailers 66-70 gauge the discounts for the aggregate products on the optimized shopping list to yield an overall profit. In another embodiment, consumer 62 proposes the discounted offer for products on the optimized shopping list. Consumer 62 will patronize a particular retailer to purchase all products on the optimized shopping list for the consumer-proposed discounted offers. Each optimized shopping list 174-178 will have the retailer, location, products, individualized pricing, aggregate savings, and total cost for all of the products on the shopping list, as shown in FIGS. 15a-15c. The total savings can be presented as a "save up to" value based on actual pricing of the retailer or an average or highest local, regional, or national regular pricing. For example, the "save up to" value can be the highest price from any retailer in a region over the past year.

Consumer 62 evaluates the three optimized shopping lists 174-178 directed toward retailers 66-70, respectively, and selects one optimized shopping list and associated retailer to patronize based on retailer preference, convenience of location, time of day, time commitments, other errands close to the retailer, aggregate savings, and total cost for all of the products on the shopping list. Retailer 66 is located two miles away from consumer 62 with a total cost of $280.00 for all of the products on the shopping list. Retailer 68 is located ten miles away from consumer 62 with a total cost of $275.00 for all of the products on the shopping list. Retailer 70 is located five miles away from consumer 62 with a total cost of $300.00 for all of the products on the shopping list. In one example, consumer 62 selects retailer 66 with emphasis on the shortest travel distance (two miles), even though the total cost for all of the products on the shopping list from retailer 66 is $5.00 more than retailer 68. The extra eight miles to travel to retailer 68 is not worth the $5.00 in savings. In another example, consumer 62 selects retailer 68 with emphasis on the total cost for all of the products on the shopping list and knowledge that the consumer needs to travel in the general direction of the retailer for other commitments. As long as consumer 62 is going that direction anyway, he or she might as well take advantage of the additional $5.00 in savings from retailer 68. In another example, consumer 62 selects retailer 70 with emphasis on retailer preference. Retailer 70 is farther away than retailer 66 and more expensive than either retailer 66 or retailer 68, but consumer 62 prefers to shop at retailer 70 and the lower cost of retailers 66 and 68 is insufficient to overcome the retailer preference. On the other hand, consumer 62 may have selected retailer 66 or 68 if the relative savings are greater or the total cost for all of the products on the shopping list is substantially less. In each case, consumer 62 makes personal judgments based on retailer preference, convenience of location, time of day, time commitments, other errands close to the retailer, aggregate savings, and total cost for all of the products on the shopping list.

Consumer 62 can request an optimized shopping list limited to a predetermined number of retailers, say two retailers. Consumer service provider 72 generates the optimized shopping list for the predetermined number of retailers that provides the best overall value for consumer 62. In one embodiment, the products on the optimized shopping list are divided between the two retailers based on the lowest cost to consumer 62.

Consumer 62 patronizes the selected retailer(s) and purchases the products on the optimized shopping list. In some cases, the selected retailer may not carry a product or be out-of-stock on the optimized shopping list. The retailer can compensate with additional discounts or substitute products. If consumer 62 authorizes more than one retailer, then the optimized shopping list directs the consumer to the alternate retailer for the needed product. The receipt for the optimized shopping list after check-out confirms to consumer 62 the aggregate savings. Consumer 62 benefits by the convenience of one-stop shopping and discounts from the aggregated shopping list. The selected retailer benefits by increasing sales while maintaining an acceptable profit.

Figures 16, 17:
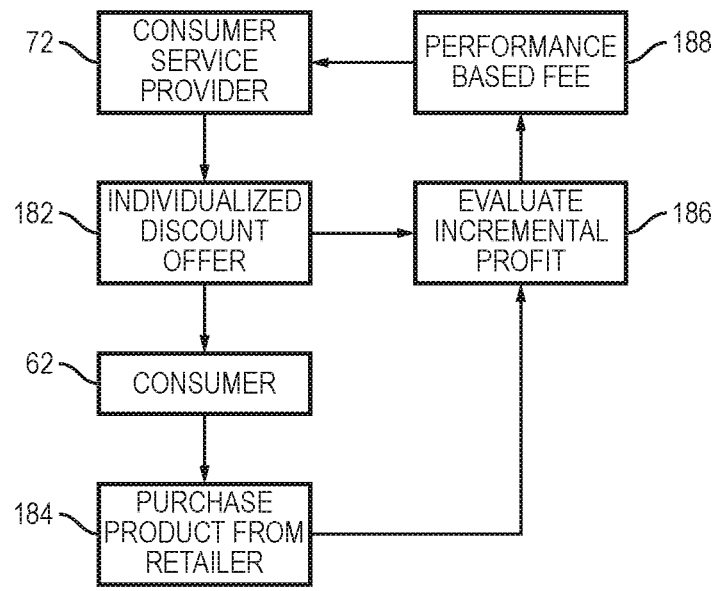
FIG. 16 illustrates the optimized shopping list with products aggregated for one retailer.
FIG. 17 illustrates an evaluation of the effectiveness of discounted offers toward incremental profits.

If the optimized shopping list is generated at the request of retailer 66, then consumer service provider 72 generates one optimized shopping list 180 with all products on the list directed to retailer 66, see FIG. 16. Consumer service provider 72 uses the individualized discounted offers 145 from retailer 66 for optimized shopping list 180. Retailer 66 can match lower individualized discounted offers from retailers 68 and 70. The net value NV can be based on the aggregation of products on optimized shopping list 180. That is, an average net value NV for the aggregated products influences the decision for consumer 62 to purchase all of the product from retailer 66.

To entice consumer 62 to accept its optimized shopping list 180, retailer 66 may make further discounts of the individualized offers, even greater than the maximum discount. Retailer 66 may offer certain products at a loss, i.e., no margin or less than cost, but will make up the difference based on other products on the shopping list under a loss leader approach. Retailer 66 determines the amount of the discounts based on the total value of the shopping list. The optimized shopping list 180 represents a bundle or aggregation of products that consumer 62 is likely to purchase. Retailer 66 can offer more discounts on a $300 shopping list than a $100 shopping list. Retailer 66 can also offer more discounts on a shopping list containing higher margin products. Accordingly, the discounts offered by retailer 66 on optimized shopping list 180 are tiered based on number of products in the shopping list, total amount or value of the shopping list, and margin of individual products on the shopping list. The optimized shopping list 180 will have the retailer, location, products, individualized pricing, aggregate savings, and total cost for all of the products on the shopping list. The total savings can be presented as a "save up to" value based on actual pricing of the retailer or an average or highest local, regional, or national regular pricing. For example, the "save up to" value can be the highest price from any retailer in a region over the past year.

Consumer 62 evaluates optimized shopping list 180 directed toward retailer 66 and makes a decision to patronize the retailer based on retailer preference, convenience of location, time of day, time commitments, other errands close to the retailer, and total cost for all of the products on the shopping list. Consumer 62 patronizes retailer 66 and purchases the products on optimized shopping list 180. In some cases, retailer 66 may not offer a product or be out-of-stock on optimized shopping list 180. Retailer 66 can compensate with additional discounts or substitute products. Retailer 66 can direct consumer 62 to another retailer known to have the needed product in stock. The receipt for optimized shopping list 180 provided to consumer 62 after check-out can confirm the savings. Consumer 62 benefits by the convenience of one-stop shopping and discounts from the aggregated shopping list. Retailer 66 benefits by increasing sales while maintaining an acceptable profit.

The optimized shopping lists 174-180 are based on the assumption that consumer 62 will purchase all of the products from the single retailer or from the limited number of retailers. In some cases, consumer 62 may not in fact purchase all of the products on the optimized shopping lists 174-180 from the single retailer or from the limited number of retailers. Consumer 62 may change his or her mind at the time of purchase for a variety of reasons, e.g. product no longer needed or product out-of stock. Retailers 66-70 can factor some percentage of products that are not purchased into determining the discounts that still result in an overall profit for the shopping list. For example, retailers 66-70 assume that consumer 62 will actually purchase 95% of the total value of the optimized shopping list. The discounts are determined based on the profit margin for consumer 62 purchasing 95% of the aggregated products value on the optimized shopping list. Retailers 66-70 can track individual consumer purchases and determine which consumers routinely purchase the value of all products and which consumers routinely purchase significantly less than the value of all products on the optimized shopping list. Those consumers who regularly purchase the value of all products, or close to the value of all products, on the optimized shopping list are given greater discounts. Those consumers who regularly purchase significantly less than the value of all products on the optimized shopping list are given lesser discounts. In another embodiment, the discounted offers can be allocated at the point of sale to correspond to the value of the products purchased. That is, consumer 62 gets the full discounted offers if all or substantially all products on the optimized shopping list are in fact purchased. The discounted offers will be less if consumer 62 fails to purchase all or substantially all products on the optimized shopping list. The proposed discounted offers from the single retailer are honored if and only if consumer 62 in fact purchases all or substantially all products on the optimized shopping list. The discounted offers can also be cleared and settled after the point of sale with knowledge of the actual purchases. In any case, the retailer gauges the discounts for the aggregate products on the optimized shopping list to yield an overall profit.

The consumers can rely on personal assistant engine 74 as having produced a comprehensive, reliable, and objective shopping list in view of the consumer's profile and preference level for each weighted product attribute, as well as retailer product information and the individualized discounted offer, that will yield the optimal purchasing decision for the benefit of the consumer. Personal assistant engine 74 helps consumers 62-64 quantify and evaluate, from a myriad of potential products on the market from competing retailers, a smaller, optimized list objectively and analytically selected to meet their needs while providing the best net value. Consumers 62-64 will develop confidence in making a good decision to purchase a particular product from a particular retailer. While the consumer makes the decision to place the product in the basket for purchase, he or she comes to rely upon or at least consider the recommendations from consumer service provider 72, i.e., optimized shopping list 144 with the embedded individualized discount contributes to the tipping point for consumers to make the purchasing decision. The consumer model generated by personal assistant engine 74 thus in part controls many of the purchasing decisions and other aspects of commercial transactions within commerce system 60.

The purchasing decisions actually made by consumers 62-64 while patronizing retailers 66-70 can be reported back to consumer service provider 72 and retailers 66-70. Upon completing the check-out process, the consumer is provided with an electronic receipt of the purchases made. The electronic receipt is stored in cell phone 116, downloaded to personal assistant engine 74, and stored in central database 146 for comparison to optimized shopping list 144. The actual purchasing decisions made when patronizing retailers 66-70 may or may not coincide with the preference levels or weighted attributes assigned by the consumer when constructing the original shopping list. For example, in choosing the canned soup, consumer 62 may have decided at the time of making the purchasing decision that one product attribute, e.g., product ingredients, is more important than another product attribute, e.g., brand. Consumer 62 made the decision to deviate from optimized shopping list 144, based on product ingredients, to choose a different product than the one recommended on the optimized shopping list. Personal assistant engine 74 can prompt consumer 62 for an explanation of the deviation from optimized shopping list 144, i.e., what product attribute became the overriding factor at the moment of making the purchasing decision. Personal assistant engine 74 learns from the actual purchasing decisions made by consumer 62 and can update the preference levels of the consumer weighted product attributes. The preference level for product ingredients can be increased and/or the preference level for brand can be decreased. The revised preference levels for the consumer weighted product attributes will improve the accuracy of subsequent optimized shopping lists. The pricing and other product information uploaded from cell phone 116 after consumer checkout to personal assistant engine 74 can also be used to modify the product information, e.g., pricing, in central database 146.

Consumers 62-64 can also utilize personal assistant engine 74 without a product of interest necessarily being on optimized shopping list 144. While patronizing retailer's store with or without optimized shopping list 144, the consumer can take a photo of the barcode of any product of interest using cell phone 116. The photo is transmitted to personal assistant engine 74. Personal assistant engine 74 reviews the consumer weighted attributes for that product and determines the individualized discounted offer available from the retailer for that consumer. If there is no consumer weighted attributes on file for the product of interest, then personal assistant engine 74 can offer a default individualized discount determined by the personal assistant engine and/or the retailer. The individualized discount is transmitted back to the consumer and displayed on cell phone 116. The consumer can make the purchasing decision at that moment with knowledge of the available individualized discounted offer. With the benefits of personal assistant engine 74, consumers 62-64 need no longer pay the stated regular shelf price for virtually any product. Consumers 62-64 can receive an individualized discounted offer for any product at any time.

As another feature of consumer service provider 72, retailers 66-70 can allocate marketing funds to the consumer service provider for distribution as individualized discounts to consumers 62-64. The marketing funds can also originate with manufacturers 32, distributors 36, or other member of commerce system 30, see FIG. 2. Personal assistant engine 74 distributes the marketing funds in the form of individualized discounted offers when compiling optimized shopping list 144. By utilizing personal assistant engine 74, retailers 66-70 are not just randomly distributing a discounted offer, e.g., as with mailbox flyers and coupons, with hope that a consumer might purchase a product from the retailer based on the general discount. By teaming with consumer service provider 72, retailers 66-70 are reaching a targeted market segment, e.g., a specific consumer, that has already acknowledged a need or interest for the product by creating the shopping list via website 138. The individualized discount from retailers 66-70 is offered to the consumer who is likely to buy or at least has expressed interest in the retailer's product. Retailers 66-70 will have reached the consumer at or near the tipping point in the purchasing decision process. Since the marketing funds are used to support the individualized discounts and the discounts are made available to the consumer at the point of making the purchasing decision via optimizing shopping list 144, and the actual purchasing decision can be measured and correlated by the electronic receipt with the optimized shopping list, the allocation of marketing funds can be tracked by performance based criteria and reported back to retailers 66-70. Retailers 66-70 will know with a level of certainty that the marketing dollar is indeed generating additional revenue and profit.

Consumer service provider 72 may use a business model which involves no cost to the consumers for use of personal assistant engine 74 but rather relies upon a shared percentage of the incremental revenue or profit (used herein interchangeably) earned by choosing the least individualized discounted offer that will result in a positive purchasing decision by the consumer. Retailers 66-70 may share 0-100% of the incremental revenue or profit associated with the various individualized discounts that can be offered to the consumer as compensation to consumer service provider 72. The sharing percentage to consumer service provider 72 will be greater than zero because 0% gives little or no motivation for consumer service provider 72 to recommend the retailer's product. Likewise, the sharing percentage will be less than 100% because that level of sharing would leave no portion for retailers 66-70. In one embodiment, the sharing percentage to consumer service provider 72 is 30-50% of the incremental revenue or profit from the least individualized discounted offer that will result in a positive purchasing decision by the consumer.

Retailers 66-70 need a way to evaluate the effectiveness of a promotional campaign, such as the individualized discounted offers described above. If retailers 66-70 are expending resources into the promotional campaign, then the retailers would likely want to know that the promotional campaign is successful, i.e., yielding more revenue and profit as a direct result of implementing the promotional campaign than would have been realized otherwise.

FIG. 17 illustrates an approach to evaluating the effectiveness of the individualized discounted offers made available to consumers 62 and 64. The evaluation also provides a process of assessing the fee paid to consumer service provider 72 based on an objective performance of individualized discounted offers. The performance based fee paid to consumer service provider 72 is determined in accordance with demonstrable incremental revenue or profits generated for retailers 66-70 arising from consumers 62 and 64 actually making a purchasing decision to buy the product as a direct result of receiving the individualized discount offers.

Consumer service provider 72 makes an individualized discounted offer 182 available to each of consumers 62 and 64 for product P1 with authorization and funding from retailers 66-70. Personal assistant engine 74 will determine the least individualized discounted offer 182 that will result in a positive purchasing decision for product P1 by the consumer. That is, personal assistant engine 74 must find the consumer purchase tipping point in terms of the individualized discounted offer. Consumers 62 and 64 each get an individualized discounted offer 182 for product P1, which may be the same or may be different depending on the shopping list and weighted product attributes as determined for each consumer.

In the present example, consumer service provider 72 transmits an individualized discounted offer of $1.25 to consumer 62 for product P1. In block 184, consumer 62 patronizes retailer 66-60 and purchases product P1 using individualized discounted offer 182. The purchase of product P1 by consumer 62 is recorded in T-LOG data 20. In block 186, an evaluation is made of the purchase of product P1 using individualized discounted offer 182, as well as other objective metrics described below, to determine the incremental revenue or profit to retailer 66-70.

When distributing individualized discounted offers 182 to consumers 62-64, personal assistant engine 74 can measure incremental profitability associated with the various individualized discounts for product P1 that can be offered to the consumer. Assume that the maximum retailer acceptable discounted offer for product P1 is set to a predetermined value of $2.00. Based on their business plan and profit margin, retailers 66-70 cannot profitably sell product P1 with any greater discount. The retailer authorizes personal assistant engine 74 to offer the consumer an individualized discounted offer 182 no greater than the $2.00 maximum discount for product P1. If consumer 62 or 64 purchases product P1 with individualized discounted offer 182 less than the maximum discount, then an incremental revenue or profit is realized because the consumer purchased product P1 for a higher price (regular price–individualized discounted offer) than would have been earned with the maximum discount (regular price–maximum retailer acceptable discount). The difference between the maximum discounted offer authorized by retailers 66-70 and the amount of the individualized discounted offer 182 made to consumers 62 and 64 is the incremental profit. Consumer service provider 72 is paid a performance based fee 188 from the incremental revenue or profit, e.g., a share or percentage of the incremental revenue or profit for product P1.

For example, if the retailer has authorized a maximum discounted offer of $2.00 and consumer 62 is offered an individualized discounted offer of $1.25, then the incremental profit is $0.75 for product P1. That is, the retailer is willing to offer a maximum discount of $2.00, but consumer service provider 72 has determined that consumer 62 would likely purchase product P1 for $1.25 discount. The regular price, individualized discounted offer 182, and actual purchase of product P1 is recorded in T-LOG data 20, as described in FIG. 1 and Table 1. T-LOG data 20 shows that consumer 62 did indeed purchase product P1 with the individualized discounted offer of $1.25. The retailer realized $0.75 more revenue or profit than would have been earned if consumer 62 had received a maximum discount of $2.00. The incremental profit for the transaction involving the sale of product P1 to consumer 62 is $0.75. Based on a sharing percentage of 30%, consumer service provider 72 receives a performance based fee of $0.75*0.30=$0.225 for the purchase of product P1 by consumer 62.

In another transaction, consumer service provider 72 determines that consumer 64 would likely purchase product P1 for a $0.50 discount. Consumer service provider 72 transmits an individualized discounted offer of $0.50 to consumer 64 for product P1. In block 184, consumer 64 patronizes retailers 66-70 and purchases product P1 using the individualized discounted offer 182. The purchase of product P1 by consumer 64 is recorded in T-LOG data 20. In evaluation block 186, T-LOG data 20 shows that consumer 64 did indeed purchase product P1 with the individualized discounted offer of $0.50. The retailer realized $1.50 more profit than would have been earned if consumer 64 had received the maximum retailer acceptable discount of $2.00. The incremental profit for the transaction involving the sale of product P1 to consumer 64 is $1.50. Based on a sharing percentage of 30% in block 188, consumer service provider 72 receives a performance based fee of $1.50*0.30=$0.45 for the purchase of product P1 by consumer 64.

Retailers 66-70 can monitor the incremental revenue or profit in block 186 and provide assurances to their management that the marketing budget is being well spent via individualized discounted offers 182. T-LOG data 20 shows that the consumer purchased the product with an individualized discounted offer 182 that is less than the maximum retailer acceptable discount. The promotional campaign achieved its goal in that the consumer actually redeemed the discounted offer. The retailer made a sale and received more profit than would have been realized with the maximum retailer acceptable discount. Retailers 66-70 benefit because they pay consumer service provider 72 only if an incremental profit is realized. If the consumer does not redeem the discounted offer, then there is no incremental profit. The retailer does not have to pay consumer service provider 72 for generating a non-redeemed discounted offer. In addition, retailers 66-70 receive the remainder of the incremental profit after distributing a share to consumer service provider 72. If the incremental profit is small, then the portion paid to consumer service provider 72 is proportionately small. If the incremental profit is large, then both retailers 66-70 and consumer service provider 72 benefit by their relative proportions of the incremental revenue or profit. The retailer can rely on effective utilization of the marketing budget because the compensation to consumer service provider 72 is based on objective, positive results. The performance based pricing, promotion, and personalized offer management is effective and useful for consumers 62 and 64, retailers 66-70, and consumer service provider 72.

The discounted offers made to consumers 62 and 64 can be other than individualized discounted offers 182. Consumer service provider 72 can make a discounted offer that is less than the maximum discounted offer authorized by retailers 66-70 to a targeted segment of the consumer populace. For example, one or more retailers 66-70 may make a promotional offer for product P1 with maximum discount of $2.00. Consumer service provider 72 transmits a discounted offer of $1.25 to all consumers who have identified product P1 as being a frequently used product from optimized shopping list 144 or by considering each line item of the consumer's shopping list from webpage 138. Alternatively, consumer service provider 72 transmits a discounted offer of $1.25 to a group of consumers within a geographic region or with similar consumer demographics based on consumer profiles, see FIG. 6. All consumers in the targeted segment receive the same $1.25 discounted offer for product P1.

A promotion identifier or code is attached to the discounted offer sent to the targeted consumer segment. When the consumers in the targeted segment redeem the discounted offer, the identifier relating the purchase of product P1 to the promotion is stored with T-LOG data 20 for the transaction. The identifier in T-LOG data 20 enables retailers 66-70 to associate the purchase of product P1 with the promotion. In this case, the identifier in T-LOG data 20 shows that consumer 62 did indeed purchase product P1 with the discounted offer of $1.25. The retailer realized $0.75 more profit than would have been earned if consumer 62 had received a maximum retailer acceptable discount of $2.00. The incremental profit for the transaction involving the sale of product P1 to consumer 62 is $0.75. Based on a sharing percentage of 50%, consumer service provider 72 receives a performance based fee of $0.75*0.50=$0.375 for the purchase of product P1 by consumer 62.

The incremental profit can be based on the aggregate products purchased from the optimized shopping list 174-180. The total of the individualized discounted offers for the aggregated products (regular prices–individualized discounted offers) is greater than the maximum discount (regular prices–maximum retailer acceptable discounts). The total of the difference between the maximum discounted offers authorized by retailers 66-70 and the amount of the individualized discounted offers made to consumers 62 and 64 is the aggregate incremental profit. Consumer service provider 72 is paid a performance based fee from the aggregate incremental revenue or profit, e.g., a shared percentage times the incremental revenue or profit for the aggregated products.

The sharing percentage, incremental profit, or revenue to consumer service provider 72 (sharing percentage times incremental profit) can be used as a basis for prioritizing the products from retailers 66-70 on optimized shopping list 144. The retailer that is positioned to achieve the highest incremental revenue or profit and/or that is offering consumer service provider 72 the highest sharing percentage can be placed in first position on optimized shopping list 144. Consumer service provider 72 can allow retailers 66-70 to set sharing percentage because the retailers will compete for making the best individualized discounted offer which benefits the consumer, as well as offering the highest sharing percentage which benefits consumer service provider 72. The retailer is still assured of making a profit on the allocated marketing funds because the fee paid to consumer service provider 72 is a percentage (less than 100%) of the incremental profit. The retailer gets the remainder of the incremental profit in the form of increased revenue. The retailer only pays a percentage of the measurable incremental revenue or profit and is assured of a positive net return on investment from its marketing budget.

FIG. 18 illustrates another embodiment of evaluating the effectiveness of the individualized discounted offers made available to consumers, including an analysis of the motivation for the purchasing decision, i.e., whether the individualized discounted offer is a primary catalyst for inducing the sales transaction for the consumer. A control group 190 is established to represent a group of consumers that receive a control discounted offer 208. The control discounted offer 208 can be any value between no discounted offer and the maximum discounted offer authorized by retailers 66-70. Control group 190 includes consumers 192, 194, and 196 known to consumer service provider 72 by the profiles created in FIG. 6. An offer group 200 is established to represent a group of consumers that receive a discounted offer less than the maximum retailer acceptable discount. Offer group 200 includes consumers 202, 204, and 206 known to consumer service provider 72 by the profiles created in FIG. 6. Retailers 66-70 can also assist with determining members of control group 190 and offer group 200 based on shopper loyalty cards or other T-LOG data 20.

In one embodiment, consumers 192-196 of control group 190 are selected to have motivational tendencies similar to consumers 202-206 of offer group 200. For example, consumer 192 is selected for control group 190 because he or she purchases similar products with similar weighted attributes as consumer 202, based on respective shopping lists. Likewise, consumers 194 and 196 purchase similar products with similar weighted attributes as consumers 204 and 206.

A consumer assigned to control group 190 for one promotional product or group of promotional products can be assigned to offer group 200 for a different promotional product or different group of promotional products. FIG. 19 illustrates a chart 220 of consumers assigned to control group 190 and offer group 200 based on the promotional product. Consumer 192 is assigned to control group 190 for promotional product P1 and assigned to offer group 200 for promotional product P2. Consumer 202 is assigned to control group 190 for promotional product P3 and assigned to offer group 200 for promotional product P4.

In another embodiment, the members of control group 190 are selected as consumers having higher probability of purchasing product P1 with the control discounted offer, while the members of offer group 200 are selected as consumers having lower probability of purchasing product P1 with the individualized discounted offer. Alternatively, the members of control group 190 are selected as consumers having lower probability of purchasing product P1 with the control discounted offer, while the members of offer group 200 are selected as consumers having higher probability of purchasing product P1 with the individualized discounted offer. In any case, control group 190 typically has fewer members than offer group 200 because retailers 66-70 still want to get discounted offers out to a majority of the potential consumers. For example, 5-20% of the pool of target customers is assigned to control group 190 and the remaining 80-95% of the pool of target customers is assigned to offer group 200.

In another embodiment, retailers selected a product or group of products associated with a particular promotional campaign to be evaluated. The products selected for individualized discounted offers overlap the buying habits of control group 190 and offer group 200 in time, geographic region, and demographics of the consumers. The members of control group 190 and offer group 200 are randomly selected as consumers having a high probability of purchasing the promoted product(s). The consumers of control group 190 receive the control discounted offer, and the consumers of offer group 200 receive individualized discounted offers. FIG. 20 illustrates a chart 222 of consumers assigned to control group 190 and offer group 200 based on promotional time period. Consumer 192 is assigned to control group 190 for product P1 during time period T1 and assigned to offer group 200 for product P1 during promotional time period T2. Consumer 202 is assigned to control group 190 for product P1 during promotional time period T3 and assigned to offer group 200 for product P1 during promotional time period T4.

Returning to FIG. 18, consumer service provider 72 makes a control discounted offer of zero, i.e., no offer, to consumers 192-196 of control group 190. Consumer service provider 72 makes an individualized discounted offer 210 available to consumers 202-206 of offer group 200 with authorization from retailers 66-70. The individualized discounted offers 210 are less than the maximum retailer acceptable discount. In block 212, consumers 192-196 of control group 190 and consumers 202-206 of offer group 200 patronize retailers 66-70. The consumers may or may not purchase products from retailers 66-70, but to the extent that purchases are made, the consumers of control group 190 buy the products at regular price (no offer) and the consumers of offer group 200 use individualized discounted offer 210.

In block 214, an evaluation is made of purchases of product P1 by consumers 202-206 of offer group 200 to determine the incremental revenue or profit to retailers 66-70. The actual purchase of product P1 using the individualized discounted offer 210 is recorded in T-LOG data 20, as described in FIG. 1 and Table 1. The difference between the maximum discounted offer authorized by retailers 66-70 and the amount of the individualized discounted offer 210 made to consumers 202-204 in offer group 200 is the incremental revenue or profit.

For example, if the retailer has authorized a maximum discounted offer of $1.00 for product P1 and consumer 202 is offered an individualized discounted offer of $0.55, then the incremental profit is $0.45. That is, the retailer is willing to offer a maximum discount of $1.00, but consumer service provider 72 had determined that consumer 202 would likely purchase product P1 for a $0.55 discount. T-LOG data 20 shows that consumer 202 did indeed purchase product P1 with the individualized discounted offer of $0.55. The retailer realized $0.45 more profit than would have been earned if consumer 202 had received the maximum retailer acceptable discount of $1.00. The incremental profit for the transaction involving the sale of product P1 to consumer 202 is $0.45.

The evaluation metric further shows a comparison between the products purchased by consumers 192-196 of control group 190 and the products purchased by consumers 202-206 of offer group 200. If consumer 202 purchased product P1 with individualized discounted offer 210 and consumer 192, having no discounted offer, patronized the retailer but did not purchase product P1, then a statistical correlation can be determined that the individualized discounted offer 210 is a controlling factor in the purchasing decision. That is, two or more consumers having similar purchasing trends and similar weighted attributes associated with product P1, or similar probability of purchasing the product during the promotional period, would likely purchase the product with the proper motivation. The size of control group 190 and offer group 200 is sufficiently large and length of the promotional period is sufficiently long to discount the possibility that consumer 192 did not patronize the retailer during the promotional period or, if the consumer did patronize the retailer, that product P1 was not needed during the instant trip. Since consumer 202 did purchase product P1 with individualized discounted offer 182 and consumer 192 did not purchase product P1 with no discounted offer, the individualized discounted offer is deemed as the controlling factor given the other statistical similarities between the consumers.

On the other hand, if consumer 202 purchased product P1 with individualized discounted offer 210 and consumer 192, having no discounted offer, also purchased the product P1, then a statistical correlation can be determined that the individualized discounted offer 210 is not a controlling factor in the purchasing decision. The actions of control group 190 provide a statistical correlation as to the motivation of offer group 200 in purchasing product P1 with individualized discount 210. Since consumer 192 in control group 190 made the decision to purchase product P1 without a discounted offer, then motivation behind the purchase by a similarly situated consumer in offer group 200 is likely attributed to factors other than the individualized discounted offer. The evaluation of purchasing decisions made by control group 190 and offer group 200 gives a statistical weight of the correlation between the individualized discounted offer 210 and the motivation behind offer group 200 in purchasing product P1.

Consumer service provider 72 is paid a performance based fee 216 from the incremental revenue or profit, e.g., a percentage of the incremental revenue or profit. If the evaluation demonstrates that the purchasing decisions made by consumers 202-206 in offer group 200 is primarily attributed to the individualized discounted offer 210, i.e., because consumers 192-196 of control group 190 did not purchase the product when no discounted offer was made, then consumer service provider 72 receives a full share of the incremental profit. The incremental profit can be statistically correlated to the individualized discounted offer 210 as being the primary motivational influence in the purchasing decision.

If the evaluation demonstrates to some degree that the purchasing decisions made by consumers 202-206 in offer group 200 can be attributed to factors other than the individualized discounted offer 210, i.e., because one or more consumers 192-196 of control group 190 also purchased the product with no discounted offer, then consumer service provider 72 receives a reduced share or no share of the incremental profit. The incremental profit cannot be statistically correlated to the individualized discounted offer 210 as being the primary motivational factor to the purchasing decision by offer group 200.

Figures 21, 22:
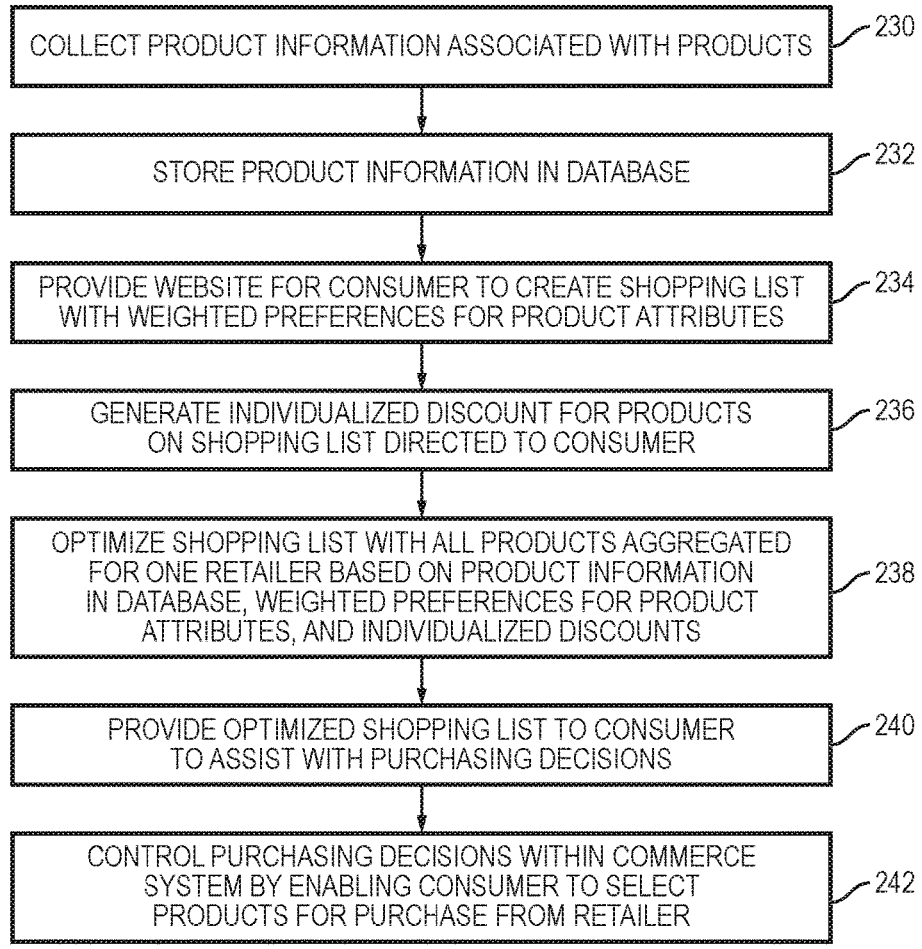
FIG. 21 illustrates consumers assigned to the control group and offer group making purchasing decisions.
FIG. 22 illustrates the process of controlling activities within the commerce system by distributing the incremental revenue or profit between members of the commerce system.

FIG. 21 illustrates a chart 224 of actual consumer purchases when assigned to control group 190 or offer group 200 during a promotional time period T1. Chart 224 shows consumers, assigned group, store, regular price, discounted offer, actual selling price with discount, and incremental profit. For promotional product P1 with a maximum discounted offer of $1.00, during promotional time period T1, when assigned to offer group 200, consumer 202 purchased quantity one of product P1 with individualized discounted offer 210 of $0.90 from store S1. The incremental profit for consumer 202 is $1.00-0.90=$0.10. When assigned to offer group 200, consumer 204 purchased quantity two of product P1 with individuatized discounted offer 210 of $0.50 from store S1. The incremental profit for consumer 204 is 2($1.00-0.50)=$1.00. When assigned to control group 190, consumer 194 purchased quantity one of product P1 with no discounted offer from store S2. When assigned to control group 190, consumers 192 and 196 did patronize store S1 but did not purchase product P1 with no discounted offer. Note that consumer 206 assigned to offer group 200 did patronize store S2 but did not purchase product P1 with individualized discounted offer of $0.25. There is no incremental profit for consumer 206.

In the example of FIG. 21, consumer 194 did purchase product P1 with no discount during the promotional time period T1, but consumers 192 and 196 did not purchase product with no discount. Consumer service provider 72 receives a reduced share of the incremental profit because the statistical correlation between the individualized discounted offer 210 and the purchasing decisions by offer group 200 a diminished by the actions of consumer 194. On the other hand, if all consumers of control group 190 had patronized store S1 or S2 but did not purchase product P1, then consumer service provider 72 would have received a full share of the incremental profit because of the strong statistical correlation of the actions taken by all consumers in control group 190. The fact that consumer 206 did not purchase product P1 can be attributed to an individualized discounted offer that was insufficient to trip the purchasing decision or lack of need for product P1 during the promotional time period T1.

The discounted offers made to consumers 202-206 of offer group 200 can be other than individualized discounted offers 210. Consumer service provider 72 can make a discounted offer that is less than the maximum discounted offer authorized by retailers 66-70 to a specific segment of the consumer populace. For example, one or more retailers 66-70 may make a promotional offer for product P1 with maximum retailer acceptable discount of $2.00. Consumer service provider 72 transmits a discounted offer of $1.25 to all consumers 202-204 of offer group 200 who have identified product P1 as being a frequently used product from optimized shopping list 144 or by considering each line item of the consumer's shopping list from webpage 138. Alternatively, consumer service provider 72 transmits a discounted offer of $1.25 to a group of consumers within a geographic region or with similar consumer demographics based on consumer profiles, see FIG. 6. All consumers 202-206 of offer group 200 in the targeted segment receive the same $1.25 discounted offer. All consumers 192-196 of control group 190 in the targeted segment receive the same control discounted offer, e.g., no offer. A promotion identifier or code is attached to the discounted offer sent to the targeted consumer segment. When the consumers 202-206 of offer group 200 in the targeted segment redeem the discounted offer, the identifier relating the purchase of product P1 to the promotion is stored with T-LOG data 20 for the transaction. The identifier in T-LOG data 20 enables retailers 66-70 to associate the purchase of product P1 with the promotion.

The incremental profit or revenue for the promoted product is determined in equations (2)-(4), given the metrics of control group 190 and offer group 200.

$$\pi_{OG} = \sum_{x=1}^{m} \pi_{ox} \quad (2)$$

$$\pi_{CG} = \sum_{y=1}^{n} \pi_{cy} \quad (3)$$

$$\Delta\pi = S_{OG} * \left(\frac{\pi_{OG}}{S_{OG}} - \frac{\pi_{CG}}{S_{CG}}\right) \quad (4)$$

where: $\pi_{OG}$ is profit realized from the offer group for the product over all transactions
  $\pi_{CG}$ is profit realized from the control group for the product over all transaction
  $\pi_{ox}$ is profit realized from the offer group for one transaction
  $\pi_{cy}$ is profit realized from the control group for one transaction
  $\Delta\pi$ is incremental profit or revenue
  $S_{OG}$ is size of the offer group in terms of number of customers, average group sales, or average group profit
  $S_{CG}$ is size of the control group in terms of number of customers, average group sales, or average group profit
In one embodiment, $\pi_{ox}=u_x(d_{MAX}-d_x)$ and $\pi_{cy}=u_y(d_{MAX})$, $u_x$ and $u_y$ are unit sales, d is the maximum discounted offer, and $d_x$ is the individualized discounted offer or discounted offer with identifier. Alternatively, $\pi_{ox}=u_x$ (regular price–$d_x$–cost) and $\pi_{cy}=u_y$ (regular price–cost).

Retailers 66-70 can monitor the incremental profit in block 214, as well as the statistical correlation between the incremental profit and the individualized offers, and provide assurances to their management that the marketing budget is being well spent via individualized discounted offer 210. T-LOG data 20 shows that the consumers purchased product P1 with an individualized discounted offer 182 that is less than the maximum retailer acceptable discount. The promotional campaign achieved its goal in that the consumers actually redeemed the discounted offer. The retailer made a sale and received more profit than would have been realized with the maximum retailer acceptable discount. Retailers 66-70 benefit because they pay consumer service provider 72 only if an incremental profit is realized. If the consumer does not redeem the discounted offer, then there is no incremental profit. The retailer does not have to pay consumer service provider 72 for generating a non-redeemed discounted offer. In addition, retailers 66-70 receive the remainder of the incremental profit after distributing a share to consumer service provider 72. If the incremental profit is small, then the portion paid to consumer service provider 72 is proportionately small. If the incremental profit is shown to be statistically uncorrelated to the individualized discounted offers, then the portion paid to consumer service provider 72 is even less or zero. If the incremental profit is large and statistically correlated to the individualized discounted offers, then both retailers 66-70 and consumer service provider 72 benefit by their relative proportions of the incremental profit. The retailer can rely on effective utilization of the marketing budget as the compensation to consumer service provider 72 is based on objective, positive results with a statistical correlation between the discounted offer and the purchasing decisions of the offer group based on the purchasing decisions of the control group with the control discounted offer. The performance based pricing, promotion, and personalized offer management is effective and useful for consumers 62 and 64, retailers 66-70, and consumer service provider 72.

The incremental profit can relate to products other than the product associated with the individualized discounted offer or general (same discount for all consumers) discounted offer. Assume product P1 and product P2 are competing products, i.e., the consumer will choose between product P1 or product P2, but not purchase both. If the discounted offer is directed to product P1, and the increase in sales of product P1 results in a decrease in sales of product P2, i.e., promotional cannibalization, then incremental profit is determined by the difference in increased revenue from sales product P1 at the discounted offer and the decrease in revenue for sales of product P2 at its regular price. In another example, if a first general discounted offer is directed to product P1 and a second general discounted offer is directed at product P2, and the change in sales of product P1 results in an increase or decrease in sales of product P2, then incremental profit is determined by the difference in revenue change from sales product P1 at the first general discounted offer and the change in revenue for sales of product P2 at the second general discounted offer.

In another embodiment, control group 190 is made up of consumers who have made previous purchase transactions without a discounted offer. The historical sales data is contained within T-LOG data 20. By using historical sales from general consumers as control group 190, the size of the control group can be greatly expanded which increases its statistical relevance. The evaluation of incremental profit in block 214 and performance based fee 216 proceeds as described above.

In another embodiment, consumers 192-195 of control group 190 receive the maximum discounted offer for product P1. The evaluation of incremental profit in block 214 and performance based fee 216 proceeds as described above. The incremental profit or revenue for the promoted product can be determined in accordance with equation (5) based on control group 190 receiving the maximum discounted offer. The incremental profit or revenue for multiple promoted products P can be determined in accordance with equation (6).

$$\Delta \pi = \sum_{x=0}^{n} u_x(d_{MAX} - d_x) \quad (5)$$

where: $\Delta \pi$ is incremental profit or revenue
$u_x$ is unit sales
$d_{MAX}$ is sales with the maximum discounted offer
$d_x$ is the individualized discounted offer or discounted offer with identifier $$\Delta \pi = \sum_{x=0}^{n} u_{x,p}(d_{MAX} - d_{x,p}) \quad (6)$$

where: $\Delta \pi$ is incremental profit or revenue
$u_{X,P}$ is unit sales for product p
$d_{MAX}$ is sales with the maximum discounted offer
$d_{X,P}$ is the individualized discounted offer or discounted offer with identifier for product P The sharing percentage between retailers 66-70 and consumer service provider 72 can be set to a value that maximizes the revenue to the consumer service provider. The revenue or fee earned by consumer service provider 72 is the product of the incremental revenue or profit and sharing percentage. The retailer that is able to achieve the highest incremental revenue or profit and further is offering the highest sharing percentage, i.e., maximum revenue to consumer service provider 72 as sharing percentage times incremental profit, is likely to be placed in first position on optimized shopping list 144. Consumer service provider 72 can allow retailers 66-70 to set sharing percentage because the retailers will compete for making the best individualized discounted offer which benefits the consumer, as well as offering the highest sharing percentage which benefits consumer service provider 72. The retailer is still assured of making a profit on the allocated marketing funds because the fee paid to consumer service provider 72 is a percentage (less than 100%) of the incremental profit. The retailer gets the remainder of the incremental profit in the form of increased revenue. The retailer only pays a percentage of the measurable incremental revenue or profit and is assured of a positive net return on investment from its marketing budget.

FIG. 22 illustrates a process for controlling a commerce system including a plurality of retailers offering products for sale. In step 230, product information associated with the products is collected. In step 232, the product information is stored in a database. In step 234, a website is provided for a consumer to create a shopping list with weighted preferences for product attributes. In step 236, an individualized discount is generated for products on the shopping list directed to the consumer. In step 238, the shopping list is optimized with all products aggregated for one retailer based on the product information in the database, the weighted preferences for the product attributes, and the individualized discounts. The individualized discount is based on an aggregate value of the optimized shopping list. The individualized discount can be set to a value less than cost for some products on the optimized shopping list. A plurality of optimized shopping lists can be generated each with all products aggregated for one retailer. One of the optimized shopping lists is selected by the consumer based on consumer preference. An aggregate savings for the optimized shopping list, e.g., a save up to value, is provided to the consumer. In step 240, the optimized shopping list is provided to the consumer to assist with purchasing decisions. In step 242, the purchasing decisions within the commerce system are controlled by enabling the consumer to select the products for purchase from the one retailer. The consumer service provider is compensated with a shared percentage of an incremental profit based on an aggregation of the products on the optimized shopping list.

In summary, the consumer service provider in part controls the movement of goods between members of the commerce system. The personal assistant engine offers consumers economic and financial modeling and planning, as well as comparative shopping services, to aid the consumer in making purchase decisions by optimizing the shopping list according to consumer-weighted preferences for product attributes. The optimized shopping list requires access to retailer product information. The consumer service provider uses a variety of techniques to gather product information from retailer websites and in-store product checks made by the consumer. The optimized shopping list helps the consumer to make the purchasing decision based on comprehensive, reliable, and objective retailer product information, as well as an individualized discounted offer. The optimized shopping list can be all products needed by the consumer aggregated for one retailer. The individualized discount can be based on an aggregate value of the optimized shopping list. The consumer makes purchases within the commerce system based on the optimized shopping list and product information compiled by the consumer service provider. By following the recommendations from the consumer service provider, the consumer can receive the most value for the money. The consumer service provider becomes the preferred source of retail information for the consumer, i.e., an aggregator of retailers capable of providing one-stop shopping.

The consumer service provider is compensated based on a shared percent of an incremental profit. The incremental profit is determined from the maximum retailer discount less the individualized discounted offer. The incremental profit can be based on an aggregation of the products on the optimized shopping list.

By providing the consumer an optimized shopping list to make purchasing decisions based on comprehensive, reliable, and objective retailer product information, as well as an individualized discounted offer, the members of the commerce system cooperate in controlling the flow of goods. In addition, by evaluating the effectiveness of the marketing program and sharing the incremental profit between retailers and consumer service provider, the members of the commerce system receive a fair distribution of compensation based on actions taken and relative value provided by each member. Retailers benefit by selling more products with a higher profit margin. Consumers receive the best value for the dollar for needed products. Consumer service provider enables an efficient and effective connection between the retailers and consumers. The consumer service provider is evaluated and compensated based on the value brought to enabling and completing transactions between members of the commerce system.

In particular, enabling the consumer to make purchasing decisions based on the optimized shopping list, as well as fair distribution of the profit between members of the commerce system, e.g., between the retailers and consumer service provider, operates to control activities within the commerce system. The optimized shopping list and distribution of the incremental profit in part controls the business interactions of retailers, consumers, and consumer service provider. Retailers offer products for sale. Consumers make decisions to purchase the products. The optimized shopping list and distribution of the incremental profit from the shopping list influences how consumer service provider connects the retailers and consumers to control activities within the commerce system.

While one or more embodiments of the present invention have been illustrated in detail, the skilled artisan will appreciate that modifications and adaptations to those embodiments may be made without departing from the scope of the present invention as set forth in the following claims.

What is claimed:

1. A method of controlling consumer transactions within a physical commerce system, comprising:
   initiating a webcrawler on a computer;
   setting an execution priority for the webcrawler to avoid interfering with other tasks running on the computer;
   parsing, by the webcrawler, product information from a plurality of retailer websites;
   providing a physical commerce system involving the movement of goods between a plurality of members of the physical commerce system;
   generating a shopping list from the product information with weighted preferences for product attributes entered by a consumer;
   generating a first individualized discount for a product on the shopping list at a first retailer;
   generating a second individualized discount for the product at a second retailer;
   optimizing the shopping list using a processor by,
   (a) calculating a first consumer value for purchasing the product at the first retailer based on the weighted preferences,
   (b) calculating a second consumer value for purchasing the product at the second retailer based on the weighted preferences,
   (c) calculating a first net value based on the first consumer value and the first individualized discount,
   (d) calculating a second net value based on the second consumer value and the second individualized discount,
   (e) updating the first individualized discount or the second individualized discount after calculating the first net value and second net value,
   (f) updating the first net value and second net value after updating the first individualized discount or the second individualized discount, and
   (g) adding the product for purchase at the first retailer with the first individualized discount to the optimized shopping list based on determining the first net value is greater than the second net value; and
   providing a plurality of control systems for the members of the physical commerce system, wherein adding the product for purchase at the first retailer with the first individualized discount to the optimized shopping list results in a purchase decision which directs the control systems to cause movement of the goods within the physical commerce system.

2. The method of claim 1, further including providing a user interface for the consumer to create the shopping list with the weighted preferences for the product attributes.

3. The method of claim 1, further including:
   generating a plurality of optimized shopping lists each with all products aggregated for one retailer; and
   selecting one of the optimized shopping lists to patronize based on consumer preference.

4. The method of claim 1, further including setting the first individualized discount based on an aggregate value of all products on the optimized shopping list.

5. The method of claim 1, further including determining a net value to the consumer based on an aggregation of the products on the optimized shopping list.

6. The method of claim 1, further including determining the incremental profit based on an aggregation of the products on the optimized shopping list.

* * * * *